US009239382B2

(12) United States Patent
Paglieroni et al.

(10) Patent No.: US 9,239,382 B2
(45) Date of Patent: Jan. 19, 2016

(54) ATTRIBUTE AND TOPOLOGY BASED CHANGE DETECTION IN A CONSTELLATION OF PREVIOUSLY DETECTED OBJECTS

(75) Inventors: David W. Paglieroni, Pleasanton, CA (US); N. Reginald Beer, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 511 days.

(21) Appl. No.: 13/219,425

(22) Filed: Aug. 26, 2011

(65) Prior Publication Data
US 2013/0085982 A1    Apr. 4, 2013

Related U.S. Application Data

(60) Provisional application No. 61/377,319, filed on Aug. 26, 2010, provisional application No. 61/377,324, filed on Aug. 26, 2010.

(51) Int. Cl.
G06N 99/00 (2010.01)
G01S 13/89 (2006.01)
G01S 13/90 (2006.01)
(Continued)

(52) U.S. Cl.
CPC .............. *G01S 13/89* (2013.01); *G01S 13/003* (2013.01); *G01S 13/885* (2013.01); *G01S 13/90* (2013.01); *G01V 3/12* (2013.01); *G01V 3/15* (2013.01); *G06N 99/00* (2013.01)

(58) Field of Classification Search
CPC ....................................................... G06N 99/00
USPC ...................................................... 706/12, 62
See application file for complete search history.

(56) References Cited

U.S. PATENT DOCUMENTS 4,698,634 A    10/1987   Alongi et al.
4,716,414 A    12/1987   Luttrell et al.
(Continued)

FOREIGN PATENT DOCUMENTS

EP       534730 A1       3/1993
JP    2002322610 A       9/2002
(Continued)

OTHER PUBLICATIONS

Price, G. "Change detection as a tool for the maintenance of mine-free trackways using a forward-looking ground-penetrating radar", Proc. SPIE, vol. 4038, 2008, pp. 1383-1391.*
(Continued)

*Primary Examiner* — Kakali Chaki
*Assistant Examiner* — Vincent Gonzales
(74) *Attorney, Agent, or Firm* — Perkins Coie LLP

(57) ABSTRACT

A system that applies attribute and topology based change detection to networks of objects that were detected on previous scans of a structure, roadway, or area of interest. The attributes capture properties or characteristics of the previously detected objects, such as location, time of detection, size, elongation, orientation, etc. The topology of the network of previously detected objects is maintained in a constellation database that stores attributes of previously detected objects and implicitly captures the geometrical structure of the network. A change detection system detects change by comparing the attributes and topology of new objects detected on the latest scan to the constellation database of previously detected objects.

19 Claims, 11 Drawing Sheets

(51) Int. Cl.
*G01S 13/00* (2006.01)
*G01S 13/88* (2006.01)
*G01V 3/12* (2006.01)
*G01V 3/15* (2006.01)

(56) References Cited

U.S. PATENT DOCUMENTS

| | | | |
|---|---|---|---|
| 5,321,613 | A | 6/1994 | Porter et al. |
| 5,424,742 | A | 6/1995 | Long et al. |
| 5,751,243 | A | 5/1998 | Turpin |
| 5,796,363 | A | 8/1998 | Mast |
| 5,818,383 | A | 10/1998 | Stockburger et al. |
| 5,835,054 | A | 11/1998 | Warhus et al. |
| 6,130,641 | A | 10/2000 | Kraeutner et al. |
| 6,222,481 | B1 | 4/2001 | Abrahamson et al. |
| 6,243,036 | B1 | 6/2001 | Chadwick et al. |
| 6,445,334 | B1 | 9/2002 | Bradley et al. |
| 6,453,058 | B1* | 9/2002 | Murthy et al. ............... 382/128 |
| 6,573,855 | B1 | 6/2003 | Hayakawa et al. |
| 6,657,557 | B1 | 12/2003 | Hsu |
| 6,975,942 | B2 | 12/2005 | Young et al. |
| 6,982,666 | B2 | 1/2006 | Temes et al. |
| 7,359,782 | B2 | 4/2008 | Breed |
| 7,382,312 | B2 | 6/2008 | Hintz |
| 7,430,303 | B2 | 9/2008 | Sefcik et al. |
| 7,511,654 | B1 | 3/2009 | Goldman et al. |
| 7,675,289 | B1* | 3/2010 | Stolarczyk et al. ........... 324/334 |
| 7,796,829 | B2 | 9/2010 | Nguyen et al. |
| 7,834,806 | B2 | 11/2010 | Tucker et al. |
| 7,860,302 | B2 | 12/2010 | Sato et al. |
| 8,059,911 | B2 | 11/2011 | Chen et al. |
| 8,094,063 | B1 | 1/2012 | Cammerata |
| 8,242,952 | B1 | 8/2012 | Barr |
| 8,280,634 | B2 | 10/2012 | Young et al. |
| 8,330,642 | B2 | 12/2012 | Jin et al. |
| 2002/0140597 | A1 | 10/2002 | Taylor et al. |
| 2003/0189511 | A1 | 10/2003 | Lasky et al. |
| 2003/0193335 | A1 | 10/2003 | Patch et al. |
| 2003/0193429 | A1 | 10/2003 | Campana et al. |
| 2004/0155810 | A1 | 8/2004 | Witten |
| 2004/0155910 | A1 | 8/2004 | Chang et al. |
| 2005/0100209 | A1 | 5/2005 | Lewis et al. |
| 2006/0087471 | A1 | 4/2006 | Hintz |
| 2006/0164287 | A1 | 7/2006 | Holt et al. |
| 2007/0024489 | A1 | 2/2007 | Cerwin |
| 2007/0188371 | A1 | 8/2007 | Callison |
| 2009/0024326 | A1* | 1/2009 | Young et al. .................. 702/5 |
| 2009/0161975 | A1 | 6/2009 | Asai et al. |
| 2010/0036595 | A1 | 2/2010 | Coy et al. |
| 2010/0052969 | A1 | 3/2010 | Niktash |
| 2010/0052971 | A1 | 3/2010 | Amarillas |
| 2010/0310177 | A1* | 12/2010 | Xiong et al. .................. 382/201 |
| 2011/0202277 | A1 | 8/2011 | Haddad |
| 2011/0279305 | A1 | 11/2011 | Lellouch et al. |
| 2013/0018575 | A1 | 1/2013 | Birken et al. |
| 2013/0082856 | A1 | 4/2013 | Paglieroni et al. |
| 2013/0082857 | A1 | 4/2013 | Beer et al. |
| 2013/0082858 | A1 | 4/2013 | Chambers et al. |
| 2013/0082859 | A1 | 4/2013 | Paglieroni et al. |
| 2013/0082860 | A1 | 4/2013 | Paglieroni et al. |
| 2013/0082861 | A1 | 4/2013 | Paglieroni et al. |
| 2013/0082862 | A1 | 4/2013 | Paglieroni et al. |
| 2013/0082863 | A1 | 4/2013 | Paglieroni et al. |
| 2013/0082864 | A1 | 4/2013 | Paglieroni et al. |
| 2013/0082870 | A1 | 4/2013 | Chambers et al. |
| 2013/0085982 | A1 | 4/2013 | Paglieroni et al. |

FOREIGN PATENT DOCUMENTS

| | | |
|---|---|---|
| JP | 2011032853 A | 2/2011 |
| JP | 2012184624 A | 9/2012 |
| JP | 05087945 B2 | 12/2012 |
| WO | WO2010/093426 | 8/2010 |

OTHER PUBLICATIONS

Sadjadi, F. et al. "Detection of Buried Objects using UPR Change Detection in Polarimetric Huynen Spaces" IEEE 2008, pp. 1-6.*
Gader, P. et al., "Landmine Detection with Ground Penetrating Radar Using Hidden Markov Models", IEEE Trans. on Geoscience and Remote Sensing, vol. 39, No. 6, Jun. 2001, pp. 1231-1244.*
B. Kluge et al., "Fast and Robust Tracking of Multiple Moving Objects with a Laser Range Finder", Proc. 2001 IEE Int'l Conf. on Robotic & AUtomation, Seoul, Korea, May 21-26, 2001, pp. 1683-1688.*
U.S. Appl. No. 13/219,504, filed Aug. 26, 2011, Chambers et al.
Aliferis, I. et al., "Comparison of the diffraction stack and time-reversal imaging algorithms applied to short-range UWB scattering data," *Proc. IEEE Int. Conf. Ultra-Wideband*, Singapore, pp. 618-621, 2007.
Ammari, H. et al., "MUSIC-type electromagnetic imaging of a collection of small three-dimensional inclusions," *SIAM J. Sci. Comput.*, vol. 29, No. 2, pp. 674-709, 2007.
Ammari, H. et al., "A MUSIC algorithm for locating small inclusions buried in a half-space from the scattering amplitude at a fixed frequency," *Multiscale Model. Simul.*, vol. 3, No. 3, pp. 597-628, 2005.
Beer, N.R. et al., "Computational system for detecting buried objects in subsurface tomography images reconstructed from multistatic ultra wideband ground penetrating radar data," LLNL-12311, pp. 1-11, 2010.
Belkebir, K., Bonnard, S. et al., "Validation of 2D inverse scattering algorithms from multi-frequency experimental data," *J. Electromag. Waves App.*, vol. 14:1637-1667, 2000.
Bellomo, L. et al., "Time reversal experiments in the microwave range: description of the radar and results," *Prog. Electromag. Res.*, vol. 104, pp. 427-448, 2010.
Chambers, D.H., "Target characterization using time-reversal symmetry of wave propagation", *Int. J. Mod. Phys. B*, vol. 21, No. 20, pp. 3511-3555, 2007.
Chambers, D.H. and J.G. Berryman, "Analysis of the time-reversal operator for a small spherical scatterer in an electromagnetic field," *IEEE Trans. Ant. Prop.*, vol. 52, No. 7, pp. 1729-1738, 2004.
Chambers, D.H. and J.G. Berryman, "Target characterization using decomposition of the time-reversal operator: electromagnetic scattering from small ellipsoids," *Inv. Prob.*, vol. 22, pp. 2145-2163, 2006.
Chambers, D.H. and J.G. Berryman, "Time-reversal analysis for scatterer characterization," *Phys. Rev. Lett.*, vol. 92, No. 2, pp. 023902-1-023902-4, 2004.
Chan, K.P. and Y.S. Cheung, "Fuzzy-attribute graph with application to chinese character recognition," *IEEE Transactions on Systems, Man, and Cybernetics*, vol. 22, No. 1:153-160, Jan./Feb. 1992.
Chatelée, V. et al., "Real data microwave imaging and time reversal," *IEEE APS Int. Symp.*, pp. 1793-1796, 2007.
Chauveau, J. et al., "Determination of resonance poles of radar targets in narrow frequency bands," *Proc. 4th Euro. Radar Conf.*, Munich, pp. 122-125, 2007.
Cmielewski, O. et al., "A two-step procedure for characterizing obstacles under a rough surface from bistatic measurements," *IEEE Trans. Geos. Rem. Sens.*, vol. 45, No. 9, pp. 2850-2858, 2007.
Counts, T. et al., "Multistatic ground-penetrating radar experiments," *IEEE Trans. Geos. Rem. Sens.*, vol. 45, No. 8, pp. 2544-2553, 2007.
Cresp, A. et al., "Investigation of time-reversal processing for surface-penetrating radar detection in a multiple-target configuration," *Proc. 5th Euro. Radar Conf.*, Amsterdam, pp. 144-147, 2008.
Cresp, A. et al., "Time-domain processing of electromagnetic data for multiple-target detection," *Conf. Math. Mod. Wave Phen.*, pp. 204-213, 2009.
Cresp, A. et al., "Comparison of the time-reversal and SEABED imaging algorithms applied on ultra-wideband experimental SAR data," *Proc. 7th Euro. Radar Conf.*, Paris, pp. 360-363, 2010.
Daniels, D.J., "Ground penetrating radar for buried landmine and IED detection," *Unexploded Ordnance Detection and Mitigation*, J. Byrnes (ed.), Springer, pp. 89-111, 2009.
Daniels, D.J., "A review of GPR for landmine detection," *Int J. Sens. Imag.*, vol. 7, No. 3, pp. 90-123, 2006.

(56) References Cited

OTHER PUBLICATIONS

Daniels, D.J., "An assessment of the fundamental performance of GPR against buried landmines," *Detection and Remediation Technologies for Mines and Minelike Targets XII, Proc. SPIE*, vol. 6553, pp. 65530G-1-65530G-15, 2007.
Daniels, D.J. et al., "Classification of landmines using GPR," *IEEE RADAR '08, Proceedings*, pp. 1-6, 2008.
Devaney, A.J., "Time reversal imaging of obscured targets from multistatic data," *IEEE Trans. Ant. Prop.*, vol. 53, No. 5, pp. 1600-1619, May 2005.
Dubois, A. et al., "Localization and characterization of two-dimensional targets buried in a cluttered environment," *Inv. Prob.*, vol. 20, pp. S63-S79, 2004.
Dubois, A. et al., "Retrieval of inhomogeneous targets from experimental frequency diversity data," *Inv. Prob.*, vol. 21, pp. S65-S79, 2005.
Dubois, A. et al., "Imaging of dielectric cylinders from experimental stepped frequency data," *Appl. Phys. Lett.*, vol. 88, pp. 64104-1-164104-3, 2006.
Feng X. and M. Sato, "Pre-stack migration applied to GPR for landmine detection," *Inv. Prob.*, vol. 20, pp. S99-S115, 2004.
Fink, M. et al., "Time-reversed acoustics," *Rep. Prog. Phys.*, vol. 63:1933-1995, 2000.
Fink, M. and C. Prada, "Acoustic time-reversal mirrors," *Inv. Prob.*, vol. 17, pp. R1-R38, 2001.
Gader, P. et al., "Detecting landmines with ground-penetrating radar using feature-based rules, order statistics, and adaptive whitening," *Trans. Geos. Rem. Sens.*, vol. 42, No. 11, pp. 2522-2534, 2004.
Gaunaurd, G.C. and L.H. Nguyen, "Detection of land-mines using ultra-wideband radar data and time-frequency signal analysis," *IEE Proc. Radar Sonar Navig.*, vol. 151, No. 5, pp. 307-316, 2004.
Gilmore, C. et al., "Derivation and comparison of SAR and frequency-wavenumber migration within a common inverse scalar wave problem formulation," *IEEE Trans. Geos. Rem. Sens.*, vol. 44, No. 6, pp. 1454-1461, 2006.
Grove, A.J. et al., "General convergence results for linear discriminant updates," *Proc. COLT 97*, ACM press, pp. 171-183, 1997.
Iakovleva E. et al., "Multistatic response matrix of a 3-D inclusion in half space and MUSIC imaging,"*IEEE Trans. Ant. Prop.*, vol. 55, pp. 2598-2607, 2007.
Iakovleva, E. and D. Lesselier, "Multistatic response matrix of spherical scatterers and the back propagation of singular fields," *IEEE Trans. Ant. Prop.*, vol. 56, No. 3, pp. 825-833, 2008.
Jofre, L. et al., "UWB tomographic radar imaging of penetrable and impenetrable objects," *Proc. IEEE*, vol. 97, No. 2, pp. 451-464, 2009.
Kuhn, H.W., "The Hungarian method for the assignment problem," *Naval Research Logistics Quarterly*, 2:83-97, 1955.
Lee, W-H. et al., "Optimizing the area under a receiver operating characteristic curve with application to landmine detection," *IEEE Trans. Geos. Rem. Sens.*, vol. 45, No. 2, pp. 389-397, 2007.
Mast, J.E. and E.M. Johansson, "Three-dimensional ground penetrating radar imaging using multi-frequency diffraction tomography," *SPIE*, vol. 2275, pp. 196-204, 1994.
Johansson, E.M. and J. Mast, "Three-dimensional ground penetrating radar imaging using synthetic aperture time-domain focusing," *SPIE*, vol. 2275, pp. 205-214, 1994.
Micolau, G. and M. Saillard, "DORT method as applied to electromagnetic subsurface imaging," *Radio Sci.*, vol. 38, No. 3, 1038, pp. 4-1-4-12, 2003.
Micolau, G. et al., "DORT method as applied to ultrawideband signals for detection of buried objects," *IEEE Trans. Geos. Rem. Sens.*, vol. 41, No. 8, pp. 1813-1820, 2003.
Paglieroni, D. and F. Nekoogar, "Matching random tree models of spatio-temporal patterns to tables or graphs," *IEEE Symposium on Computational Intelligence and Data Mining*, pp. 1-8. Apr. 1-5, 2007.
Paglieroni, D., and K. Ni, "DART Queries," *IEEE Transactions on Knowledge and Data Engineering, in Revision*, LLNL-JRNL-418760, 2010.
Paglieroni, D.W. et al., "DART-based threat assessment for buried objects Detected with a ground penetrating radar over time," LLNL, pp. 1-7, 2010.
Prada, C. and M. Fink, "Eigenmodes of the time reversal operator: A solution to selective focusing in multiple-target media," *Wave Motion*, vol. 20, pp. 151-163, 1994.
Saillard, M. et al., "Reconstruction of buried objects surrounded by small inhomogeneities," *Inv. Prob.*, vol. 16, pp. 1195-1208, 2000.
Soumekh, M. et al., "3D wavefront image formation for NIITEK GPR," *Radar Sensor Technology XIII Proc. SPIE*, vol. 7308, pp. 73080J-1-73080J-12, 2009.
Throckmorton, C. et al., "The efficacy of human observation for discrimination and feature identification of targets measured by the NIITEK ground penetrating radar," *Detection and Remediation Technologies for Mines and Minelike Targets IX, Proc. SPIE*, vol. 5415, pp. 963-972, 2004.
Torrione, P.A. et al.,"Performance of an adaptive feature-based processor for a wideband ground penetrating radar system," *IEEE Trans. Aerospace Elec. Systems*, pp. 1-10, 2006.
Torrione, P.A. and L.M. Collins, "Texture features for antitank landmine detection using ground penetrating radar," *IEEE Trans. Geos. Rem. Sens.*, vol. 45, No. 7, pp. 2374-2382, 2007.
Torrione, P.A. et al., "Constrained filter optimization for subsurface landmine detection," *Detection and Remediation Technologies for Mines and Minelike Targets XI, Proc. SPIE*, vol. 6217, pp. 621710X-1-621710X-12, 2006.
Torrione, P.A., Collins, L. et al., "Application of the LMS algorithm to anomaly detection using the Wichmann/NIITEK ground penetrating radar," *Detection and Remediation Technologies for Mines and Minelike Targets VIII, Proc. SPIE*, vol. 5089, pp. 1127-1136, 2003.
Tortel, H. et al. "Decomposition of the time reversal operator for electromagnetic scattering," *J. Electromag. Waves. App.*, vol. 13, pp. 687-719, 1999.
Tsai, W-H and K-S Fu, Error-Correcting Isomorphisms of Attributed Relational Graphs for Pattern Analysis, *IEEE Transactions on Systems, Man, and Cybernetics*, vol. 9, No. 12, pp. 757-768, 1979.
Vitebskiy, S., Carin, L., "Resonances of perfectly conducting wires and bodies of revolution buried in a lossy dispersive half-space," *IEEE Trans. Ant. Prop.*, vol. 44, No. 12, pp. 1575-1583, 1996.
Vitebskiy, S. et al., "Short-pulse plane-wave scattering from buried perfectly conducting bodies of revolution," *IEEE Trans. Ant. Prop.*, vol. 44, No. 2, pp. 143-151, 1996.
Wilson, J.N. et al., "A large-scale systematic evaluation of algorithms using ground-penetrating radar for landmine detection and discrimination," *IEEE Trans. Geos. Rem. Sens.*, vol. 45, No. 8, pp. 2560-2572, 2007.
Yavuz, M.E. and F.L. Teixeira, "Full time-domain DORT for ultrawideband electromagnetic fields in dispersive, random inhomogeneous media," *IEEE Trans. Ant. Prop.*, vol. 54, No. 8, pp. 2305-2315, 2006.
Yavuz, M.E. and F.L. Teixeira, "On the sensitivity of time-reversal imaging techniques to model perturbations," *IEEE Trans. Ant. Prop.*, vol. 56, No. 3, pp. 834-843, 2008.
Yavuz, M.E. and F.L. Teixeira, "Space-frequency ultrawideband time-reversal imaging," *IEEE Trans. Geos. Rem. Sens.*, vol. 46, No. 4, pp. 1115-1124, 2008.
Zhu, Q. and L.M. Collins, "Application of feature extraction methods for landmine detection using the Wichmann/NIITEK ground-penetrating radar," *IEEE Trans. Geos. Rem. Sens.*, vol. 43, No. 1, pp. 81-85, 2005.
Zhuge, X. et al., "UWB array-based radar imaging using modified Kirchhoff migration," *Proc. 2008 IEEE Conf. Ultra-Wideband*, vol. 3, pp. 175-178, 2008.
Orlin, J.B. and R.K. Ahuja, "New Scaling Algorithms for the Assignment and Minimum Mean Cycle Problems," Mathematical Programming, vol. 54, pp. 41-56, 1992.

\* cited by examiner

ATTRIBUTE AND TOPOLOGY BASED CHANGE DETECTION IN A CONSTELLATION OF PREVIOUSLY DETECTED OBJECTS

CROSS-REFERENCE TO RELATED APPLICATION(S)

This application claims the benefit of U.S. Provisional Patent Application No. 61/377,319 filed Aug. 26, 2010, entitled "COMPUTATIONAL SYSTEM FOR DETECTING BURIED OBJECTS IN SUBSURFACE TOMOGRAPHY IMAGES RECONSTRUCTED FROM MULTISTATIC ULTRA WIDEBAND GROUND PENETRATING RADAR DATA," and U.S. Provisional Patent Application No. 61/377,324, filed Aug. 26, 2010, entitled "DART-BASED THREAT ASSESSMENT FOR BURIED OBJECTS DETECTED WITH A GROUND PENETRATING RADAR OVER TIME," which are incorporated herein by reference in their entirety.

This application is related to U.S. patent application Ser. No. 13/219,410, filed Aug. 26, 2011, entitled "REAL-TIME SYSTEM FOR IMAGING AND OBJECT DETECTION WITH A MULTISTATIC GPR ARRAY," U.S. patent application Ser. No. 13/219,430, filed Aug. 26, 2011, entitled "DISTRIBUTED ROAD ASSESSMENT SYSTEM," and U.S. patent application Ser. No. 13/219,435, filed Aug. 26, 2011, entitled "CLASSIFICATION OF SUBSURFACE OBJECTS USING SINGULAR VALUES DERIVED FROM SIGNAL FRAMES," which are incorporated herein by reference in their entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to detect the presence of an object within a medium. For example, some technologies detect the presence of (i) buried landmines in a roadway or a field for military or humanitarian purposes, or (ii) potentially hidden explosives emplaced above ground level among man-made clutter. Such technologies may use ultra wideband penetrating radar technologies, such as ground-penetrating radar ("GPR") antennas that are mounted on the front of a vehicle that travels down a roadway or across a field. The antennas could be directed into the ground with the soil being the medium and the top of the soil or pavement being the surface. In this case, GPR systems can be used to detect not only metallic objects but also non-metallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of areas below ground level, areas above ground level that may contain emplaced explosives that are potentially hidden, or the interior of concrete structures such as bridges, dams, and containment vessels to assist in assessing the integrity of the structures. In such images, the objects of interest tend to appear as distinct bright spots. In addition to referring to a foreign object that is within a medium, the term "object" also refers to any characteristic of the medium (e.g., crack in the medium and change in medium density) that is to be detected.

Some current technologies seek to detect the presence of new objects that were not detected in previous passes. For example, a convoy of military vehicles may travel over a certain roadway fairly often. If access to the roadway is not tightly controlled, the military may need to check, each time a convoy is to travel down the roadway, for the presence of landmines or other objects that may pose a hazard to the convoy. As another example, a civil engineering firm may check bridges, dams, and other structures on a regular basis (e.g., yearly) for the presence of new subsurface defects (e.g., cracks). Each time the structure, roadway or area is scanned, large amounts of data may be collected and processed. For example, the scan of the roadway may collect GPR return signals every few centimeters. GPR systems may generate image frames from the return signals and detect subsurface objects in those image frames. When these GPR systems have access to data from previous scans of that structure or roadway, the GPR systems may detect change by comparing (i) images reconstructed along the latest scan to images reconstructed along previous scans, or (ii) newly detected objects to previously detected objects.

Current penetrating radar systems do not use results from previous scans to perform change detection for objects in real-time. A major hurdle in achieving this goal is that the cost of storing the vast amounts of data collected from previous scans and comparing data from those previous scans to the latest scan may be prohibitive. A real-time system needs to process the return signals from successive sampling locations of the vehicle down-track so that, in the steady state, the return signals for one sampling location are processed within the time between samplings. Moreover, in the case of a vehicle that detects landmines, a real-time system may need to detect the presence of the landmine in time to stop the vehicle collecting the return signals before hitting the landmine.

SUMMARY

Attribute and Topology Based Change Detection in a Constellation of Previously Detected Objects A method in a computing device for determining whether a designated newly detected object represents an object that does not correspond to an object is a constellation of previously detected objects is provided. The method comprises, for each of a plurality of edge attributes, providing a likelihood function a value for the edge attribute; selecting a root previously detected object and a root newly detected object as having a root correspondence; calculating previous values for edge attributes for edges connecting the previously detected object to the root previously detected object from attributes of the previously detected objects; calculating new values for edge attributes for edges connecting newly detected objects to the root newly detected object from attributes of the newly detected objects; and indicating that the designated newly detected object is not a previously detected object based on combining a likelihood for each edge attribute, the likelihood for an edge attribute generated by the likelihood function for that edge attribute applied to the previous value of that edge attribute given the new value of that edge attribute. The method may also include assigning a cost to each pair of a newly detected object and a previously detected object, the cost being derived from the detection fitnesses and combined likelihoods of the edge attributes that define topological consistency and applying a minimal cost assignment algorithm to the costs to identify possible correspondences between each newly detected object and a previously detected object. The method may also include indicating a newly detected object corresponds to a previously detected object based on assignment of the minimal cost assignment algorithm. The method may also include generating a change index for the designated newly detected object indicating whether the designated newly detected object does not correspond to a previously detected object based on a minimum computed assignment costs to the previously detected objects. The method may also be wherein the change index is further based on fitness of detection of the object. The method may also be wherein the attributes of the objects are selected from a group consisting of location of the object, time the object was last detected, angle of long axis of the object, and length and width of the object. The method may also be wherein the edge attributes are selected from a group consisting of a pointing vector from a root detected object to a leaf detected object, difference in times of most recent detection of the root detected object and the leaf detected object, angle between long axis of the root or leaf detected object and vector from that root detected object to the leaf detected object, angle from a vector from the root detected object to a first leaf detected object to a vector from the root detected object to the leaf detected object, and angle between the long axis of the root detected object and the long axis of the leaf detected object.

A computer-readable storage device storing computer-executable instructions for controlling a computing device to identify newly detected objects that correspond to previously detected objects is provided. The identifying performed by method comprising: for each of a plurality pairs of a previously detected object and a newly detected object, generating a score based on a likelihood that the previously detected object corresponds to the newly detected object; generating a mapping from newly detected objects to corresponding previously detected object based on the generated scores; and for each newly detected object that is mapped to a previously detected object, indicating that the newly detected object corresponds to that previously detected object. The method may also be wherein the generating of the mapping includes apply a minimal cost assignment algorithm to costs represented by the generate scores. The method may also be wherein when no previously detected object maps to a newly detected object, indicating that the newly detected object is not a previously detected object. The method may also include, for each of a plurality of edge attributes, providing a likelihood function a value for the edge attribute; selecting a root previously detected object and a root newly detected object as having a root correspondence; calculating previous values for edge attributes for edges connecting the previously detected object to the root previously detected object from attributes of the previously detected objects; calculating new values for edge attributes for edges connecting newly detected objects to the root newly detected object from attributes of the newly detected objects; and generating the likelihood by combining a likelihood for each edge attribute, the likelihood for an edge attribute generated by the likelihood function for that edge attribute applied to the previous value of that edge attribute given the new value of that edge attribute. The method may also be wherein selecting a root previously detected object and a root newly detected object as having a root correspondence includes for pairs of a previously detected object and a newly detected object, evaluating the objects of the pair as having a root correspondence by calculating a mapping efficiency indicating how well the newly detected object corresponds to the previously detected object based on locations of the other newly detected objects in a vicinity of a root object relative to locations of other previously detected objects in the vicinity of a root object. The method may also be wherein the objects are detected based on return signals acquired by receivers from ground-penetrating radar signals emitted by transmitters.

A computing device for identifying newly detected objects that do not correspond to a previously detected object is provided. The computing device comprises a component that, for each of a plurality of pairs of a previously detected object and a newly detected object, generates a score based on a likelihood that the previously detected object corresponds to the recently detected object; a component that generates a mapping from newly detected objects to corresponding previously detected objects based on the generated scores; and a component that, for each newly detected object that is not mapped to a previously detected object, indicating that the newly detected object does not correspond to a previously detected object. The computing device may also be wherein the component that generates the mapping applies a minimal cost assignment algorithm to costs represented by the generate scores. The computing device may also be include a component that selects a root previously detected object and a root newly detected object as having a root correspondence; calculates previous values for edge attributes for edges connecting the previously detected object to the root previously detected object from attributes of the previously detected objects; calculates new values for edge attributes for edges connecting newly detected objects to the root newly detected object from attributes of the newly detected objects; and generates the likelihood by combining a likelihood for each edge attribute, the likelihood for an edge attribute generated by the likelihood function for that edge attribute applied to the previous value of that edge attribute given the new value of that edge attribute. The computing device may also be wherein the component that selects a root previously detected object and a root newly detected object as having a root correspondence, for pairs of a previously detected object and a newly detected object, calculates a mapping efficiency indicating how well the newly detected object corresponds to the previously detected object based on locations of the other newly detected objects relative to locations of other previously detected objects. The computing device may also be wherein the objects are detected based on return signals acquired by receivers from ground-penetrating radar signals emitted by transmitters. The computing device may also be wherein the component that generates the mapping applies a minimal cost assignment algorithm to costs represented by the generate scores.

Determining Root Correspondence Between Previously and Newly Detected Objects

A method in a computing device for identifying a root correspondence for previously detected objects and newly detected objects is provided. The method comprises, for pairs of a previously detected object and a newly detected object, evaluating the objects of the pair as having a root correspondence by calculating a mapping efficiency indicating how well the newly detected object corresponds to the previously detected object based on locations of the other newly detected objects relative to locations of other previously detected objects; and selecting a pair of a previously detected object and a newly detected object as having a root correspondence based on the calculated mapping efficiency of that pair. The method may also be wherein the mapping efficiency is a fraction of newly detected objects that are proximate to a previously detected object when spatially shifted by an offset from the newly detected object of the pair to the previously detected object of the pair. The method may also be wherein the selected pair is the pair with the largest fraction. The method may also include, when a pair has a mapping efficiency that satisfies a root correspondence criterion, designating that pair as having a root correspondence without calculating the mapping efficiency of other pairs. The method may also be include prior to calculating the mapping efficiency, generating a grid whose grid elements represent a volume within a change detection window, with each grid element indicating whether a previously detected object is positioned within the volume that the grid element represents; and wherein the mapping efficiency calculation includes: determining, for each other newly detected object, the grid element that contains the newly detected object when the newly detected object is spatially shifted by an offset from the newly detected object of the pair to the previously detected object of the pair; and increasing the mapping efficiency when the determined grid element contains a previously detected object. The method may also be wherein the calculation of mapping efficiency includes determining whether attributes of the previously detected object and the newly detected object of the pair are consistent with being the same object; and when the attributes are determined to be inconsistent, prohibiting the selection of the pair as having a root correspondence. The method may also be wherein the objects are subsurface objects within a medium.

A computer-readable storage device storing computer-executable instructions for controlling a computing device to identifying a root correspondence for previously detected object and newly detected objects is provided. The identifying is performed by a method comprising: accessing a data store storing of constellation of previously detected objects, each previously detected object having a location; receiving an indication of newly detected objects, each newly detected object having a location; for pairs of a previously detected object and a newly detected object, calculating a mapping efficiency indicating how well the newly detected object corresponds to the previously detected object based on locations of the other newly detected objects relative to locations of other previously detected objects; and selecting a pair of a previously detected object and a newly detected object as having a root correspondence based on the calculated mapping efficiencies for the pairs. The method may also be wherein the mapping efficiency is a fraction of the other newly detected objects that are proximate to another previously detected object when spatially shifted by an offset from the newly detected object of the pair to the previously detected object of the pair. The method may also be wherein the selected pair is the pair with the largest fraction. The method may also include, when a pair has a mapping efficiency that satisfies a root correspondence criterion, designating that pair as having a root correspondence without calculating the mapping efficiency of other pairs. The method may also include: generating a grid with grid elements that each represent a volume within a change detection window that includes the newly detected objects, each grid element indicating whether a previously detected object is positioned within the volume that the grid element represents; and wherein the mapping efficiency calculation includes, for each other newly detected object, determining the grid element that contains the newly detected object when the newly detected object is spatially shifted by an offset from the newly detected object of the pair to the previously detected object of the pair; and increasing the mapping efficiency when the determined grid element contains a previously detected object. The method may also be wherein the calculation of mapping efficiency includes determining whether attributes of the previously detected object and the newly detected object of the pair are consistent with being the same object; and when the attributes are determined to be inconsistent, prohibiting the selection of the pair as having a root correspondence.

A computing device for identifying a root correspondence for previously detected objects and newly detected objects is provided. The computing device comprises a component that determines how well the newly detected object corresponds to the previously detected object based on locations of the other newly detected objects relative to locations of other previously detected objects; and a component that selects a pair based on the determination. The computing device may also be wherein the component that determines of how well the objects of the pair correspond by calculating a mapping efficiency based on the location of the other newly detected objects and the other previously detected objects. The computing device may also be wherein the mapping efficiency is a fraction of newly detected objects that are proximate to a previously detected object when spatially shifted by an offset from the newly detected object of the pair to the previously detected object of the pair. The computing device may also be wherein, when a pair has a mapping efficiency that satisfies a root correspondence criterion, that pair is designated as having a root correspondence without calculating the mapping efficiency for other pairs. The computing device may also be wherein the component, that determines how well the newly detected object corresponds to the previously detected object, increases the mapping efficiency of the pair for each other newly detected object when spatially shifted by an offset from the newly detected object of the pair to the previously detected object of the pair is near a previously detected object. The computing device may also be wherein the objects are subsurface objects within a medium. The computing device may also include a component that detects objects based on return signals acquired by receivers from medium-penetrating radar signals emitted by transmitters into the medium.

DETAILED DESCRIPTION

Figure 1:
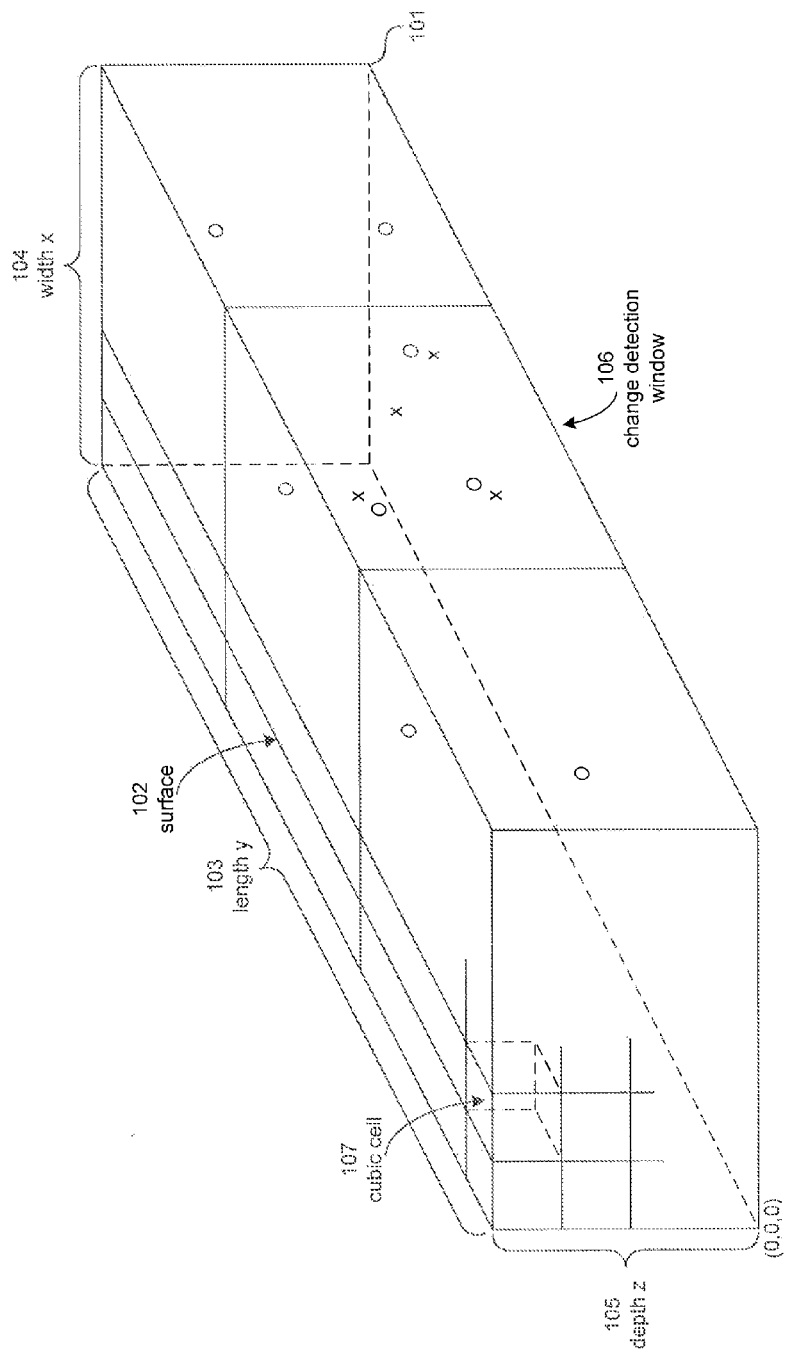
FIG. 1 is a diagram that illustrates conceptually a scan.

A method and system is provided that applies attribute and topology based change detection to networks of objects that were detected on previous scans of a structure, roadway, or area of interest. The attributes capture properties or characteristics of the previously detected objects, such as location, time of detection, size, elongation, orientation, etc. The topology of the network of previously detected objects (the geometrical structure of the network in xyz space) is maintained in a constellation database that stores attributes of previously detected objects and implicitly captures the geometrical structure of the network. In some embodiments, a change detection system detects change by comparing the attributes and topology of new objects detected on the latest scan to the constellation database of previously detected objects. The change detection system that detects objects within a scan may employ an object detection system that uses conventional detection techniques. In some embodiments, the objects are detected using the object detection system described in U.S. patent application Ser. No. 13/219,410, entitled "REAL-TIME SYSTEM FOR IMAGING AND OBJECT DETECTION WITH A MULTISTATIC GPR ARRAY," which is being filed concurrently and is hereby incorporated by reference. The change detection system maintains a constellation database that contains aggregate information, including aggregate values of attributes over prior instances of specific objects that were detected in scans prior to the latest scan. When the change detection system receives information on newly detected objects on the latest scan, it evaluates how well the newly detected objects correspond to previously detected objects topologically and in terms of attributes. The change detection system initially selects a previously detected object that appears to correspond to a newly detected object (in the sense that they topologically appear to be the same object) using a spatial network correspondence algorithm. Such a topological correspondence is referred to as the "root correspondence". The change detection system evaluates the degree of correspondence between other newly detected objects and other previously detected objects in the vicinity based on this root correspondence. The root correspondence algorithm may, for example, select a previously detected object and a newly detected object that are topologically consistent and have similar attributes. Once the change detection system selects a pair of newly and previously detected objects as the root correspondence, it calculates a "cost" associated with pairs of other newly and previously detected objects in the vicinity of the root correspondence. This cost reflects the belief that the newly detected object of the non-root pair corresponds to the previously detected object of that pair. For example, a low cost may indicate that the objects more likely correspond. The change detection system may then generate a change index for each newly detected object to quantify the belief that it might not have been previously detected (and thus constitute a change). For example, a high change index may indicate that the newly detected object is more likely to have never been detected on any previous scan. The change detection system may set the change index for a newly detected object to be the cost of assigning that object to the previously detected object that it best corresponds with based on both attributes and topological consistency. The change detection system may determine a likely correspondence between previously and newly detected objects using a standard minimal cost assignment algorithm applied to spatially localized sets of previously and newly detected objects. After determining the optimal correspondence, the change detection system updates information in the constellation database of previously detected objects with the values of the attributes of the corresponding newly detected objects, as these attributes may vary over time due to variations in scan path (e.g., direction of travel or closeness to the center of the roadway), changes in the surface (e.g., ruts in the roadway after a rainstorm), and so on. If a newly detected object corresponds to no previously detected object, then it may constitute a change. If so, the change detection system adds that object as an additional object to the constellation database, and it will be treated as a previously detected object by subsequent scans.

In some embodiments, the change detection system identifies the root correspondence for previously and newly detected objects by calculating a mapping efficiency for pairs of previously and newly detected objects. Mapping efficiency reflects the degree of topological match between previously and newly detected objects within a localized area given a presumption of root correspondence between a specific previously detected object and a specific newly detected object within that same area. The change detection system establishes the root correspondence as that pair of previously and newly detected objects for which the associated mapping efficiency is maximized. FIG. 1 is a diagram that illustrates conceptually a scan. The subsurface 101 includes a surface 102 with a length 103, a width 104, and a depth 105. For example, the length may be 20 kilometers, the width may be 5 meters, and the depth may be 2 meters. (Although the change detection system is described primarily in reference to detecting subsurface objects using a GPR system, one skilled in the art will appreciate that the change detection system may be used to detect above surface changes such as an explosive emplaced in clutter.) The change detection system may perform processing to extract newly detected objects and update the constellation database within a change detection window 106 that covers the localized neighborhood extending prior to and ahead of the current location along the scan every time the detection system detects another object. The change detection window is a volume that extends for a prescribed window length (e.g., 100 meters) for the width and depth of the medium. FIG. 1 represents the previously detected objects as O's and the newly detected objects as X's. To calculate the mapping efficiencies for potential root correspondences (for all possible pairs of an O and an X in the change detection window), the change detection system considers the subsurface to be divided into cubic cells in xyz space. To speed up the calculation of the mapping efficiency, the change detection system may maintain a data structure indicating the cubic cells that contain a previously detected object. The change detection system may use a binary flag (e.g., 0 or 1) to indicate the absence or presence of a previously detected object within a cubic cell. The change detection system regards each pair of previously and newly detected objects as a potential root correspondence. For a candidate newly detected root correspondence object, the change detection system computes a vector in xyz space from that newly detected object to each of the remaining newly detected objects in the neighborhood. It then determines the endpoints of such vectors emanating from the location of the candidate previously detected object in the root correspondence pair, and counts the number of cells of value 1 that contain the endpoints of those vectors.

The mapping efficiency is then the number of such 1s divided by the number of vectors that were considered, and it varies from 0 to 1. The change detection system designates the pair of previously and newly detected objects with the largest mapping efficiency as the root correspondence. The change detection system may use grid cells other than cubes. For example, the grid cells may have a different width, length, and depth. Also, the width, length, and depth of the grid cell need not be constant. For example, depths of the grid cells may be less toward the surface to reflect a higher confidence in the location of detected objects that are nearer to the surface.

In some embodiments, the change detection system generates a cost matrix with one row for each newly detected object in vicinity of the newly detected object in the root pair, and one column for each previously detected object in that same vicinity (excluding the previously detected object in the root pair). For each entry in the cost matrix, the change detection system generates a cost (or score) reflecting belief that the newly detected object associated with that entry does not correspond to the previously detected object associated with that entry, given the root correspondence established as described above. The change detection system calculates the cost for each such pair based on (i) detection fitness for objects in that pair and (ii) topological consistency between those objects. The fitness of a detection is a measure of goodness or strength of an object detection, and it varies from 0 to 1. Topological consistency also varies from 0 to 1, and it reflects the degree of consistency between attributes of the previously and newly detected objects in the pair. These attributes are referred to as edge attributes, and they include the orientation of an object relative to its root, the pointing vector from the root to the object, the orientation angles of the object and its root relative to the pointing vector, and so on. The edge attributes are derived from the attributes of the objects (vertices) that they connect, where the vertex attributes include object location, time of detection, orientation, length, width, elongation, etc. In some embodiments, the topological consistency between a pair of previously and newly detected objects is computed by evaluating the likelihood of the attributes of the edge that connects the previously detected object to its root relative to the attributes of the edge that connects the newly detected object to its root. The joint likelihood of edge attributes is modeled as the product of marginal likelihood functions of one variable for each of the edge attributes. The change detection system provides a marginal likelihood function for each edge attribute that takes the value of the corresponding attribute for the edge that connects the newly detected object to its root as the mode or peak location. The variance of each marginal likelihood function may be specific to each edge attribute, and reflects the degree of uncertainty in attribute values captured by a distributional attributed relational tree as described below in detail. The change detection system then determines the minimal cost assignment (one-to-one mapping) of newly detected objects to previously detected objects from the cost matrix.

In some embodiments, after generating a cost matrix, the change detection system updates the constellation database to reflect the newly detected objects. The change detection system may apply a minimal cost assignment algorithm to identify the correspondences between previously and newly detected objects that represent the most likely correspondence. One suitable minimal cost algorithm is described in Orlin, J. B. and Ahuja, R. K., "New Scaling Algorithms for the Assignment and Minimum Cycle Mean Problems", Mathematical Programming, Vol. 54, 1992, pp. 41-56, which is hereby incorporated by reference. After identifying the most likely correspondence between the previously and newly detected objects, the change detection system updates the constellation database for the previously detected objects to reflect the attributes of the corresponding newly detected objects. If a newly detected object does not have a corresponding previously detected object, then the change detection system adds that newly detected object to the constellation database.

Figure 2:
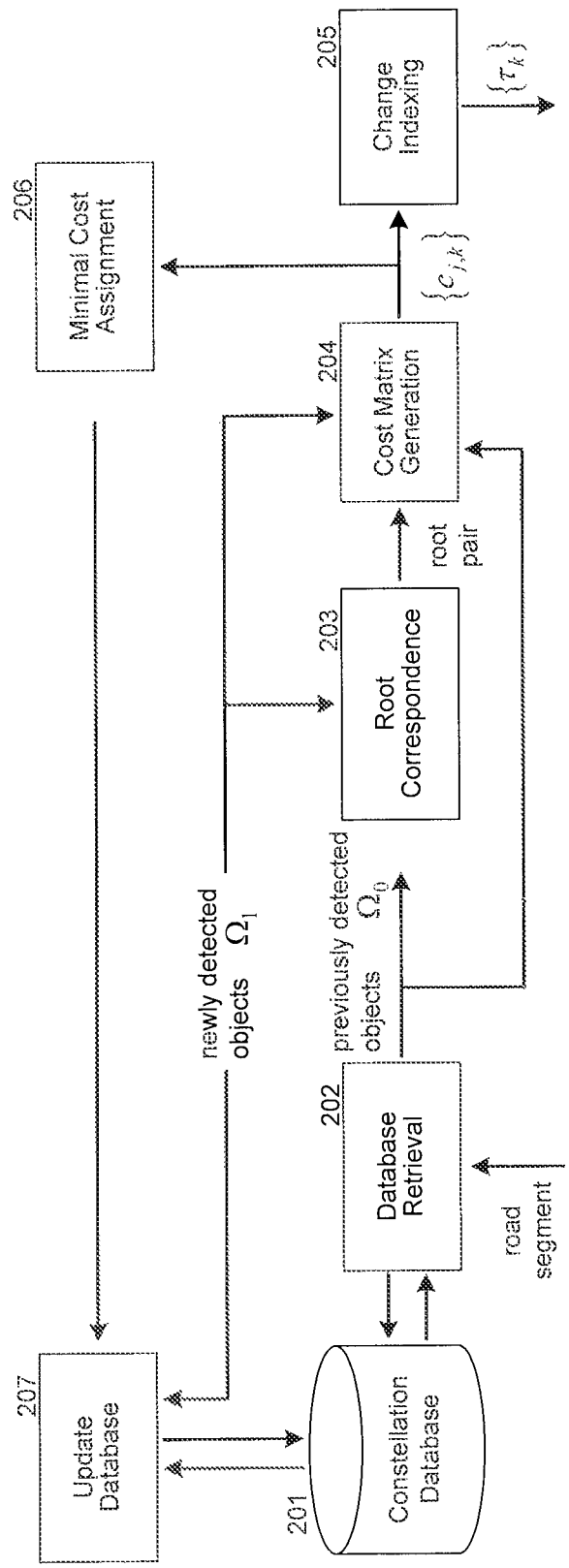
FIG. 2 is a block diagram that illustrates the overall flow of the change detection system in some embodiments.

FIG. 2 is a block diagram that illustrates the overall flow of the change detection system in some embodiments. A constellation database 201 contains the previously detected objects. A "database retrieval" component 202 retrieves previously detected objects from the constellation database, accepts newly detected objects detected by the object detection system on the latest scan, and saves them as new objects. A "root correspondence" component 203 identifies a specific pair of previously and newly detected objects as the root correspondence for the purpose of generating the cost matrix. A "cost matrix generation" component 204 generates the cost matrix. A "change indexing" component 205 generates the change indices for the newly detected objects from the cost matrix. A "minimal cost assignment" component 206 identifies the most likely correspondence between previously and newly detected objects. An "update database" component 207 updates the constellation database based on the established correspondence between the previously and newly detected objects.

Figure 3:
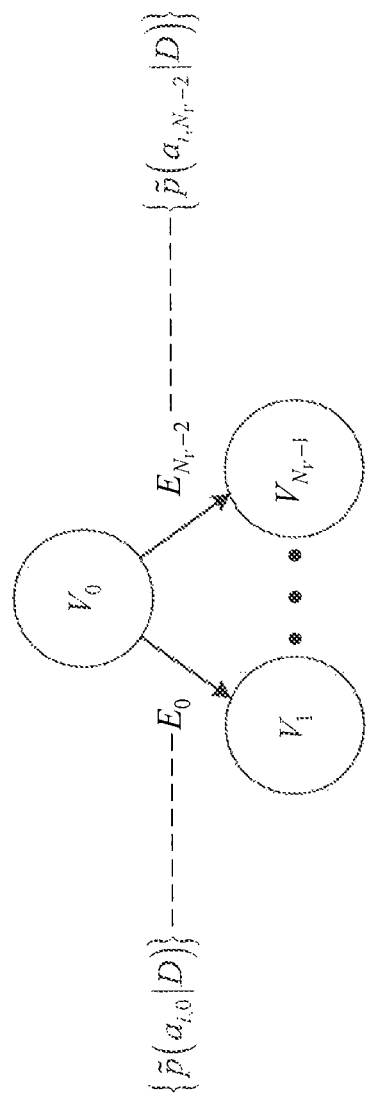
FIG. 3 illustrates a distributionally attributed relational tree with $N_V$ vertices.

In some embodiments, the change detection system represents the newly detected objects as vertices in an attributed relational tree ("ART"). An ART is an attributed graph G with a bi-level tree topology. FIG. 3 illustrates a relational tree with $N_V$ vertices (one root $V_0$ plus $N_V-1$ leaves $$\{V_i\}_{i=1}^{N_V-1}\}$$

and $N_E = N_V - 1$ edges $$\{E_k\}_{k=0}^{N_E-1}$$

($E_k$ connects $V_0$ to $V_{k+1}$). The change detection system uses a relational tree to represent a localized network of newly detected objects detected on the latest scan. The ART ontology defines admissible entity types for vertices (e.g., the type of object detected) and the attributes of its vertices and edges. Examples of attributes for the vertices and edges are represented in Table 1.

TABLE 1

| Vertex Attributes $A_i$ | |
| --- | --- |
| s | fitness of the detection $\in [0, 1]$ |
| (x, y, z) | xyz location |
| $(t_0, t_1)$ | time (first, last) detected |
| θ | long axis angle in xy $\in (-\pi/2, \pi/2)$ |
| L, w | Length, width $\geq 0$ |
| λ = L/w | elongation 0 or $\geq 1$ |
| Edge Attributes $a_i$ | |
| $(\Delta_x, \Delta_y, \Delta_z)$ | edge pointing vector |
| $\Delta_t$ | $(t_1)_{leaf} - (t_1)_{root}$ |
| α | angle from the long axis of the root object to the edge vector from the root object and this leaf object $\in (-\pi/2, \pi/2)$ |
| β | angle from the long axis of this leaf object to the edge vector from the root object and this leaf object $\in (-\pi/2, \pi/2)$ |

TABLE 1-continued

| | |
|---|---|
| γ | angle from the vector of edge 0 in the DART to the edge vector from the root object of this leaf object $\in (-\pi, \pi)$ |
| δ | angle from the long axis of the leaf object to the long axis of the root object $\in (-\pi/2, \pi/2)$ |

The change detection system may use a distributional ART or DART D, which is a stochastic attributed relational tree model whose edge attributes $\{a_{i,k} i=0 \ldots n_a-1, k=0 \ldots N_E-1\}$ are replaced by marginal densities (likelihood functions) $p(a_{i,k}|D)$ that impose probabilistic uncertainty on the edge attribute values (FIG. 3). The change detection system may model these likelihoods as symmetric functions in one dimension (e.g., with a rectangular, triangular, or clipped Gaussian pulse shape). The change detection system considers the attributes to be statistically independent. Thus, the joint likelihood $p_k(a|D)$ for edge $E_k$ is expressed as the product of marginal likelihoods $p(a_{i,k}|D)$ $i=0 \ldots n_a-1$. The change detection system uses normalized likelihoods $\bar{p}(a_{i,k}|D)$ as shown in FIG. 3, to quantify the topological consistency between DART D and the constellation database of previously detected objects using the following equations:

$$\tilde{p}_k(a|D) = \prod_{i=0}^{n_a-1} \tilde{p}(a_{i,k}|D) \quad (1a)$$

$$\tilde{p}(a_{i,k}|D) \triangleq p(a_{i,k}|D)/\max p(a_{i,k}|D) \quad (1b)$$

The change detection system represents newly detected objects within a localized areas as $$\Omega_1 \triangleq \{V_k(\Omega_1)\}_{k=0}^{m_1-1}$$

and previously detected objects within that same general area as $$\Omega_0 \triangleq \{V_j(\Omega_0)\}_{j=0}^{m_0-1}.$$

The change detection system identifies a root correspondence $[V_0(\Omega_0), V_0(\Omega_1)]$ between $\Omega_0$ and $\Omega_1$ such that vertex $V_0(\Omega_0)$ of $\Omega_0$ and vertex $V_0(\Omega_1)$ of $\Omega_1$ represent the previously and newly detected object in the root correspondence. Algorithm 1 provides an algorithm for identifying a root correspondence.

Algorithm 1 e(i, j) = 0
for i' = 0 ... $m_1$ - 1 (i' ≠ i)
   a. Compute the direction vector from $V_i$ ($\Omega_1$) to $V_{i'}$ ($\Omega_1$):
   [$\Delta_x, \Delta_y, \Delta_z$] =
   [x($V_{i'}$($\Omega_1$)) - x($V_i$ ($\Omega_1$)), y($V_{i'}$($\Omega_1$)) - y($V_i$ ($\Omega_1$)), z($V_{i'}$($\Omega_1$)) - z($V_i$ ($\Omega_1$))]
   b. Find the grid cell that the direction vector points to if it starts from $V_j$ ($\Omega_0$):

Algorithm 1

$$(i'', j'', k'') = \text{int}\left(\frac{x(V_j(\Omega_0)) + \Delta_x - x_{min}}{\varepsilon}\right),$$
$$\left(\frac{y(V_j(\Omega_0)) + \Delta_y - y_{min}}{\varepsilon}\right), \left(\frac{z(V_j(\Omega_0)) + \Delta_z - z_{min}}{\varepsilon}\right)$$

c. Increment e(i, j) if that grid cell contains an element of $\Omega_0$:
   if cell (i'', j'', k'') = 1 then e(i, j) = e(i, j) + 1

$$e(i, j) = \frac{1 + e(i, j)}{m_1} \in \left[\frac{1}{m_1}, 1\right]$$

The change detection system establishes the root correspondence for the previously and newly detected objects to maximize mapping efficiency. The change detection system may define mapping efficiency e(i,j) as the fraction of the $m_1$ vertices in $\Omega_1$ that have possible correspondences in $\Omega_0$ for the potential root correspondence $[V_j(\Omega_0) \in \Omega_0, V_i(\Omega_1) \in \Omega_1]$, and as e(i,j)=0 if $V_j(\Omega_0) \in \Omega_0$ and $V_i(\Omega_1) \in \Omega_1$ are inconsistent as to their type, orientation, and physical dimensions. The change detection system generates a binary spatial index grid for $\Omega_0$ in xyz space (e.g., representing the area along the entire scan or along a portion of the scan). The cubic grid cells may have a width defined by the error tolerance in relative locations of objects, and the grid origin may be at the minimum x, y, and z over all previously detected objects within $\Omega_0$. The change detection system sets the value of the grid cell to 1 if it contains the centroid of an object from $\Omega_0$. Once the change detection system has identified a root correspondence, the root vertices may be designated as the vertices of index 0 in $\Omega_0$ and $\Omega_1$.

The change detection system constructs a DART D by imposing uncertainty on the ART formed from $\Omega_1$ with $V_0(\Omega_1)$ as the root. The change detection system replaces each edge attribute $a_{i,k}$ in the ART with a likelihood function $p(a_{i,k}|D)$ in DART D, where the peak and width of the likelihood function vary in accordance with the values of the attributes of the newly detected objects.

The change detection system transforms change detection into a minimal cost assignment problem in which newly detected objects captured in DART D are assigned to previously detected objects captured in the subset $\Omega_0$ of the constellation database. Once formulated, this minimal cost assignment problem can be solved using standard cost scaling methods. In some embodiments, the change detection system employs a cost function c that depends on a variable u that combines fitnesses of detections associated with a corresponding pair of previously and newly detected objects, and a variable v that quantifies topological consistency for that pair. The variables u and v both vary from zero to one, and c(u,v) is a continuous function defined on the unit square 0≤u, v≤1. The change detection system assumes that complete topological inconsistency (v=0) will lead to the highest possible cost (c=1) and that complete absence of fitness (u=0) will also lead to the highest possible cost (c=1). The lowest possible cost (c=0) applies only when topological consistency and detection fitness are both perfect (u=v=1) The change detection system may further take the cost trend for perfect topological consistency (v=1) as linear and decreasing from one to zero with fitness u. These conditions lead to the following boundary conditions for cost function c:

$$c(u,0)=1 \quad (2a)$$

$$c(u,1)=1-u \quad (2b)$$

The simplest continuous function from zero to one over the unit square that satisfies these boundary conditions is the bilinear DART cost function represented as follows:

$$c(u,v) = 1 - uv \qquad (3)$$

The change detection system characterizes topological matching of DART D to $\Omega_0$ as a minimal cost assignment problem. To accomplish this, it generates a cost matrix $\{c_{j,k}\}$ from the cost function $c(u,v)$. The rows j of $\{c_{j,k}\}$ represent previously detected objects, and the columns k represent newly detected objects. The elements $c_{j,k} \in [0,1]$ reflect the cost of making the determination that previously detected object j and newly detected object k are really the same object. The change detection system evaluates the cost matrix by solving the minimal cost assignment problem for that cost matrix.

The cost matrix $\{c_{j,k}\}$ is an $(m_0-1) \times (m_1-1)$ matrix because the root correspondence $[V_0(\Omega_0) \in \Omega_0, V_0(\Omega_1) \in \Omega_1]$ has already been established between one pair of objects. The element $c_{j,k}$ thus represents the cost of mapping previous object j+1 from $\Omega_0$ to recent object k+1 from $\Omega_1$ (i.e., leaf k+1 of DART D). The cost matrix elements $c_{j,k}$ may be derived from the cost function $c(u,v)$ as follows:

$$c_{j,k} = c(u_{j,k}, v_{j,k}) \qquad (4a)$$

$$u_{j,k} = \frac{s(V_{j+1}(\Omega_0)) + s(V_{k+1}(\Omega_1))}{2} \qquad (4b)$$

$$v_{j,k} = \tilde{p}_k(a(V_0(\Omega_0) \to V_{j+1}(\Omega_0)) \mid D) \qquad (4c)$$

where s(V) represents the fitness of vertex V, $V_0(\Omega_0) \to V_{j+1}(\Omega_0)$ represents the edge $E_{j+1}$ from $V_0(\Omega_0)$ to $V_{j+1}(\Omega_0)$ and $a(E_{j+1})$ represents the vector of attributes for edge $E_{j+1}$. The fitness $u_{j,k}$ in Equation 4b is the mean of fitnesses for the newly detected object that corresponds to vertex $V_{k+1}$ in DART D and the previously detected object that corresponds to vertex $V_{j+1}$ from $\Omega_0$. The combination of Equations 3 and 4a-c results in the following equation for cost matrix elements $c_{j,k}$:

$$c_{j,k} = 1 - \tilde{p}_k(a(V_0(\Omega_0) \to V_{j+1}(\Omega_0)) \mid D) \cdot \frac{s(V_{j+1}(\Omega_0)) + s(V_{k+1}(\Omega_1))}{2} \qquad (5)$$

For k=0 ... $m_1$-2, the change index $\tau_{k+1}$ quantifies the likelihood (from 0 to 1) that the newly detected object represented by leaf k+1 of DART D constitutes a change relative to the constellation of previously detected objects. The change detection system computes the change index $\tau_{k+1}$ for DART leaves as the minimum of the elements in column k of the cost matrix. For the DART root, the change index is expressed as the product of root fitness and the mean of the change indices for the DART leaves. Although change index calculations use the cost matrix, the calculations do not require the cost matrix to be evaluated.

---

Algorithm 2

1. Generate the cost matrix and compute change indices for the leaves of DART D:
   for k = 0 ... $m_1$ - 2
      for j = 0 ... $m_0$ - 2

$$c_{j,k} = 1 - \tilde{p}_k(a(V_0(\Omega_0) \to V_{j+1}(\Omega_0)) \mid D) \cdot \frac{s(V_{j+1}(\Omega_0)) + s(V_{k+1}(\Omega_1))}{2}$$

$$\tau_{k+1} = \min_{j=0 \ldots m_0-2} c_{j,k}$$

2. Compute the change index for the root of DART D:

$$\tau_0 = \frac{s(V_0(\Omega_0)) + s(V_0(\Omega_1))}{2} \cdot \frac{1}{m_1 - 1} \sum_{k=1}^{m_1-1} \tau_k$$

---

The change detection system learns the true structure of the network of previously detected objects over time by updating the constellation database in real time as the vehicle moves down-track. Objects never before seen are newly inserted into the constellation database with their computed attribute values. Attributes of previously seen objects are updated recursively with attribute values for the most recently acquired instances of those objects (i.e., the corresponding newly detected objects). Updates to the constellation database facilitate change detection for objects that may be encountered in the future. Also, the performance of the change detection system benefits over time from improvements in the accuracy of the constellation database.

Figure 4:
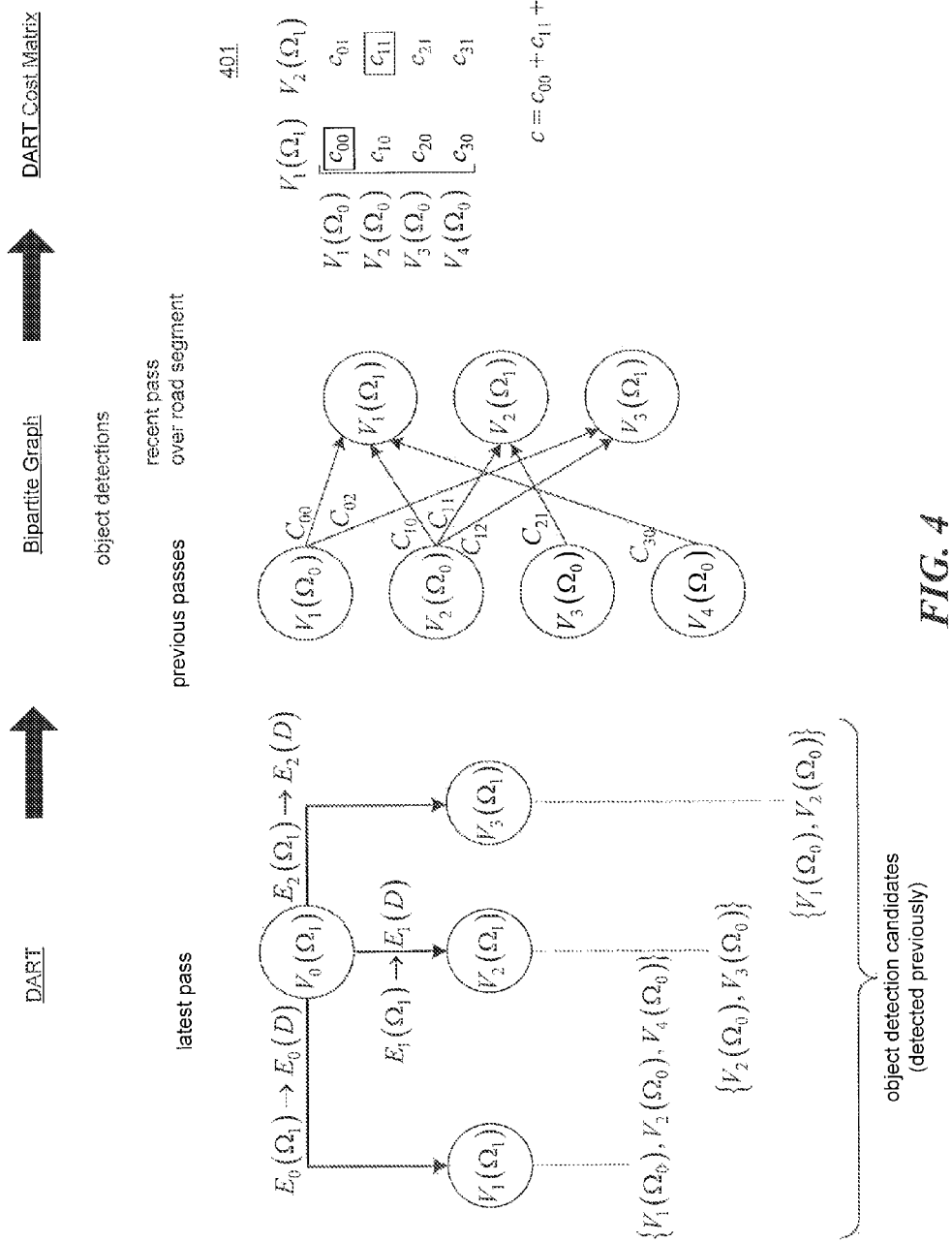
FIG. 4 illustrates the process of assigning previously detected objects to newly detected objects.

As for change index calculations, the change detection system generates a cost matrix in order to update the constellation database. However, in order to update the constellation database, the change detection system also evaluates the cost matrix by solving a minimal cost assignment problem. The result of the cost matrix evaluation may be that for k=0 ... $m_1$-1, object k of $\Omega_1$ is assigned to object j(k) of $\Omega_0$, where j(k)<0 if object k of $\Omega_1$ is new (unassigned). If object $V_k(\Omega_1)$ is unassigned, the change detection system adds that object to the constellation database as a new object. Otherwise, the change detection system updates the attributes of object $V_{j(k)}(\Omega_0)$ in the constellation database recursively with the attributes of newly detected object $V_k(\Omega_1)$. FIG. 4 illustrates the process of assigning previously detected objects to newly detected objects. After generating the cost matrix 401, the change detection system applies the minimal cost algorithm to identify the pairs of previously and newly detected objects that result in the minimal cost. In the example of FIG. 4, the pairs of objects $V_1(\Omega_0)$ and $V_1(\Omega_1)$, $V_2(\Omega_0)$ and $V_2(\Omega_1)$, and $V_4(\Omega_0)$ and $V_3(\Omega_1)$ have the minimum cost of assignment. In addition to the object attributes of Table 1, the change detection system may also maintain object attributes that include the number of times an object was detected (e.g., to assist in the recursive updating) and its maximum fitness over all detections.

Figure 5:
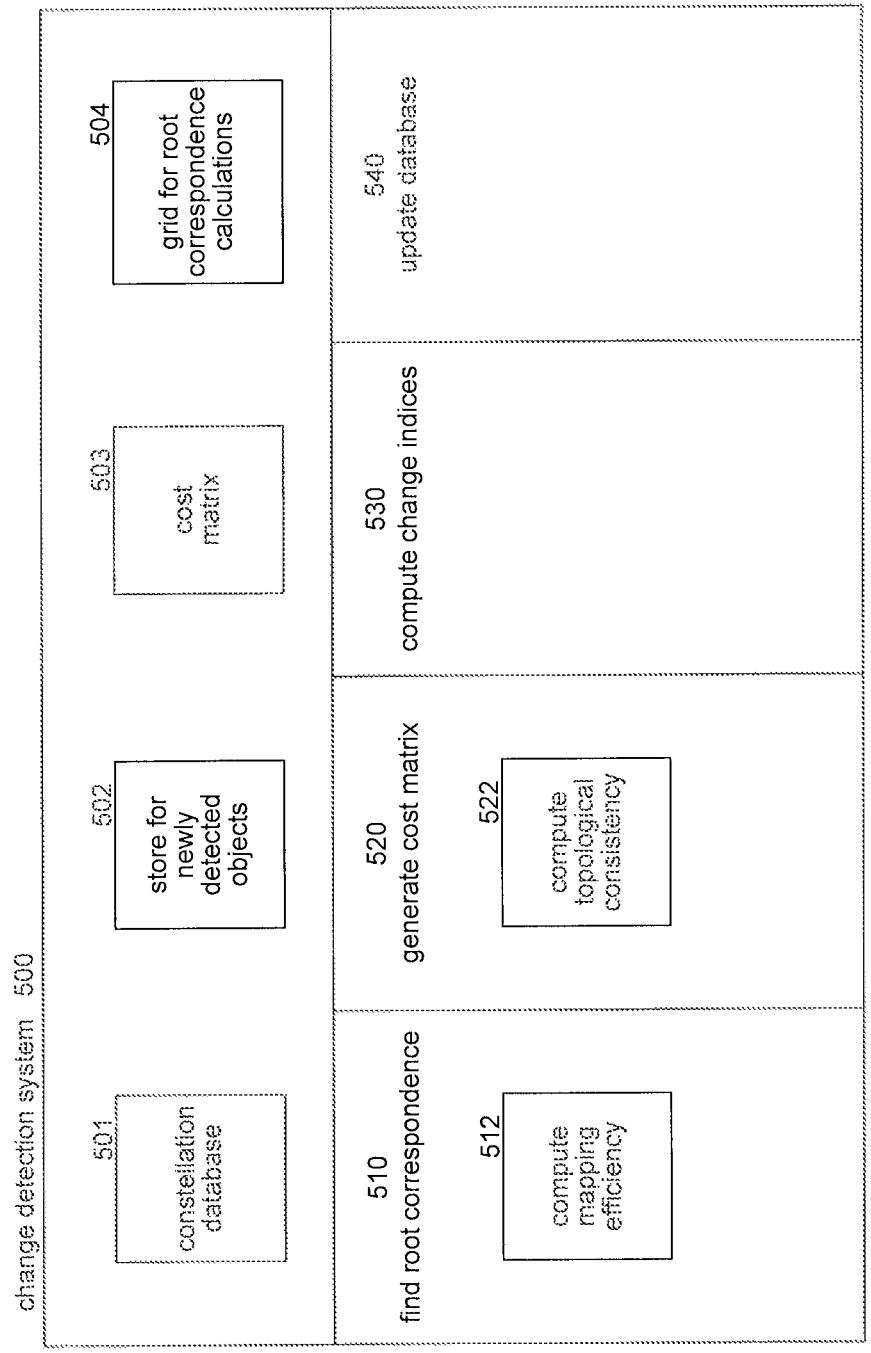
FIG. 5 is a block diagram of the components of the change detection system in some embodiments.

FIG. 5 is a block diagram of the components of the change detection system in some embodiments. The change detection system includes a constellation database 501, a store for newly detected objects 502, a cost matrix 503, and a grid data structure for root correspondence calculations 504. The constellation database contains the objects detected on previous scans and their attributes. The newly detected object store contains the objects detected on the latest scan along with their attributes. The cost matrix store is used by the change detection system to store the cost matrix. The grid data structure identifies the cubic cells within the xyz space of a localized portion of the scan that contain previously detected objects. The change detection system also includes a "find root correspondence" component 510, a "generate cost matrix" component 520, a "compute change indices" component 530, and an "update database" component 540. The "find root correspondence" component invokes a "compute mapping efficiency" component 512 to calculate a mapping efficiency and then identifies the root correspondence based on the mapping efficiencies. The "generate cost matrix" component invokes a "compute topological consistency" component 522 to generate the costs for pairs of previously and newly detected objects. The "compute change indices" component computes the change index for each newly detected object based on the cost matrix. The "update database" component updates the constellation database based on the correspondence between previously and newly detected objects as determined from the cost matrix.

The computing devices on which the change detection system may be implemented may include a central processing unit and memory and may include, particularly in the case of a system management workstation, input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the change detection system. The data transmission media is media for transmitting data using signals or carrier waves (e.g., electromagnetism) via a wire or wireless connection. Various functions of the change detection system may also be implemented on devices using discrete logic or logic embedded as an application-specific integrated circuit. The change detection system may be implemented on a computer system that is local to a vehicle to which a linear array of penetrating radar antennas is mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The change detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
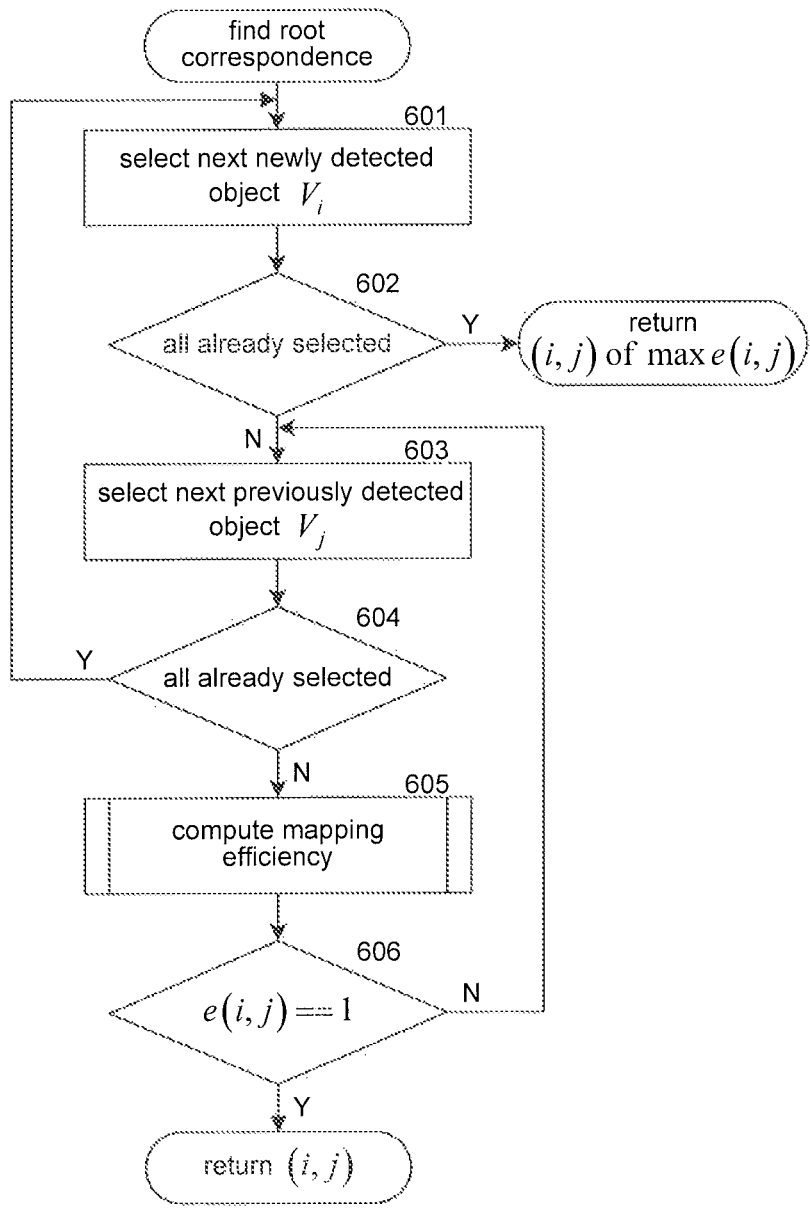
FIG. 6 is a flow diagram that illustrates the processing of the "find root correspondence" component of the change detection system in some embodiments.

FIG. 6 is a flow diagram that illustrates the processing of the "find root correspondence" component of the change detection system in some embodiments. The component calculates the mapping efficiency for pairs of previously and newly detected objects. In block 601, the component selects the next newly detected object. In decision block 602, if all the newly detected objects have already been selected, then the component returns a pair of previously and newly detected objects for which the mapping efficiency is largest as the root correspondence, else the component continues at block 603. In block 603, the component selects the next previously detected object. In decision block 604, if all the previously detected objects have already been selected, then the component loops to block 601 to select the next newly detected object, else the component continues at block 605. In block 605, the "compute mapping efficiency" component calculates the mapping efficiency for a hypothetical root correspondence between a specific pair of previously and newly detected objects. In decision block 606, if the mapping efficiency is perfect, then the component returns the previously and newly detected object selected as the root correspondence, else the component loops to block 603 to select the next previously detected object.

Figure 7:
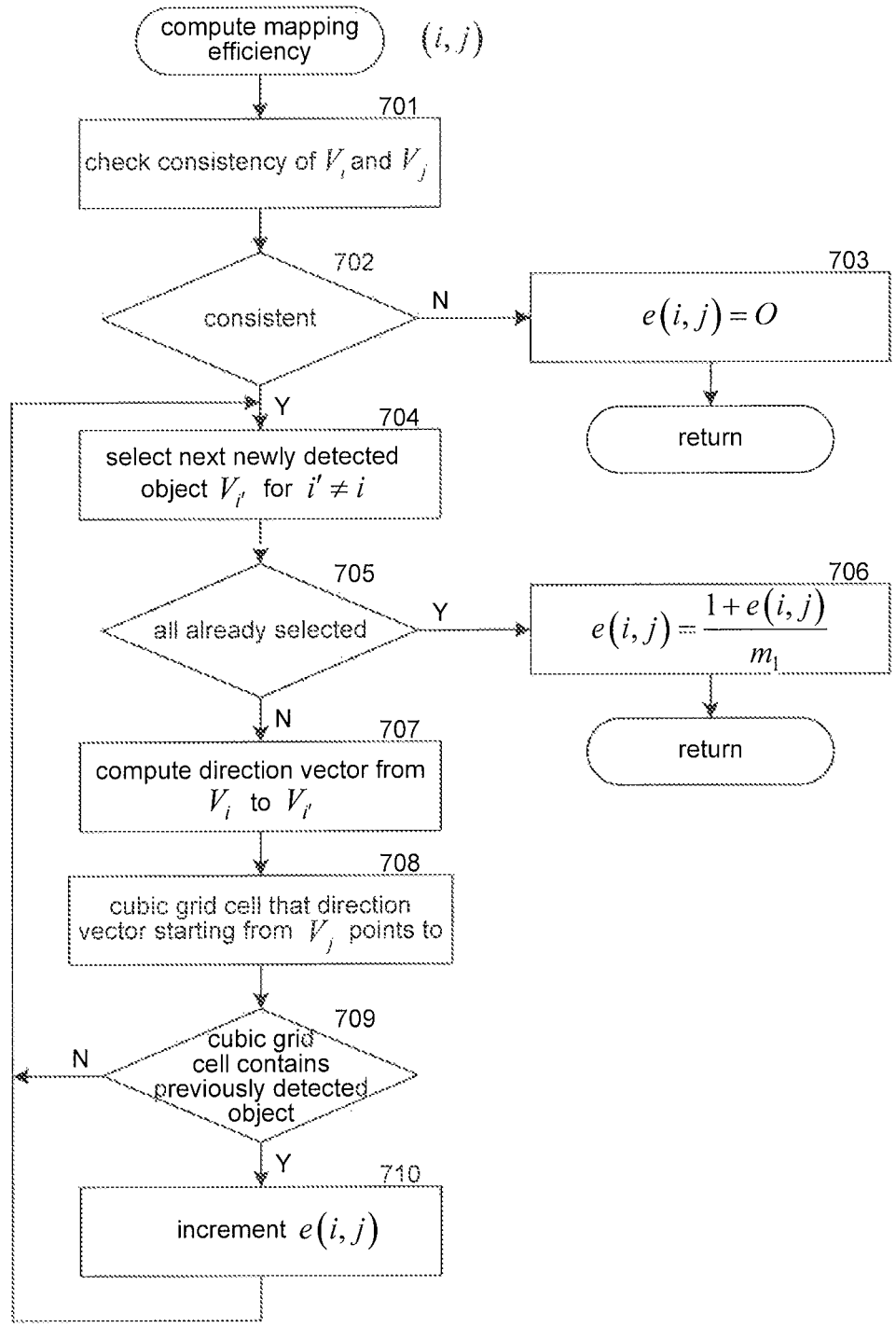
FIG. 7 is a flow diagram that illustrates the processing of the "compute mapping efficiency" component of the change detection system in some embodiments.

FIG. 7 is a flow diagram that illustrates the processing of the "compute mapping efficiency" component of the change detection system in some embodiments. The component computes mapping efficiency for a hypothetical root correspondence between a pair of previously and newly detected objects passed in as input. In block 701, the component checks consistency of the vertex attributes of the previously detected object and the newly detected object to ensure, for example, that the elongation and orientation are similar enough to indicate that they may represent the same object. In decision block 702, if the attributes are consistent, then the component continues at block 704, else the component continues at block 703. In block 703, the component sets the mapping efficiency to zero, indicating that the input pair of previously and newly detected objects cannot represent a root correspondence, and then returns. In block 704, the component selects the next newly detected object from the set of newly detected objects in the vicinity of the input newly detected object. In decision block 705, if all newly detected objects in the vicinity have already been selected, then the component continues at block 706, else the component continues at block 707. In block 706, the component computes the mapping efficiency for the input pair of previously and newly detected objects, and then returns. In block 707, the component computes a direction vector from the newly detected object of the input pair to the selected newly detected object. In block 708, the component determines the cubic grid cell of the grid data structure that contains the endpoint of the direction vector, assuming it starts at the previously detected object of the input pair. In decision block 709, if the cubic grid cell contains a previously detected object, then the component continues at block 710, else the component loops to block 704 to select the next newly detected object in the vicinity of the input newly detected object. In block 710, the component increments the mapping efficiency for the input pair and then loops to block 704 to select the next newly detected object in the vicinity of the input newly detected object.

Figure 8:
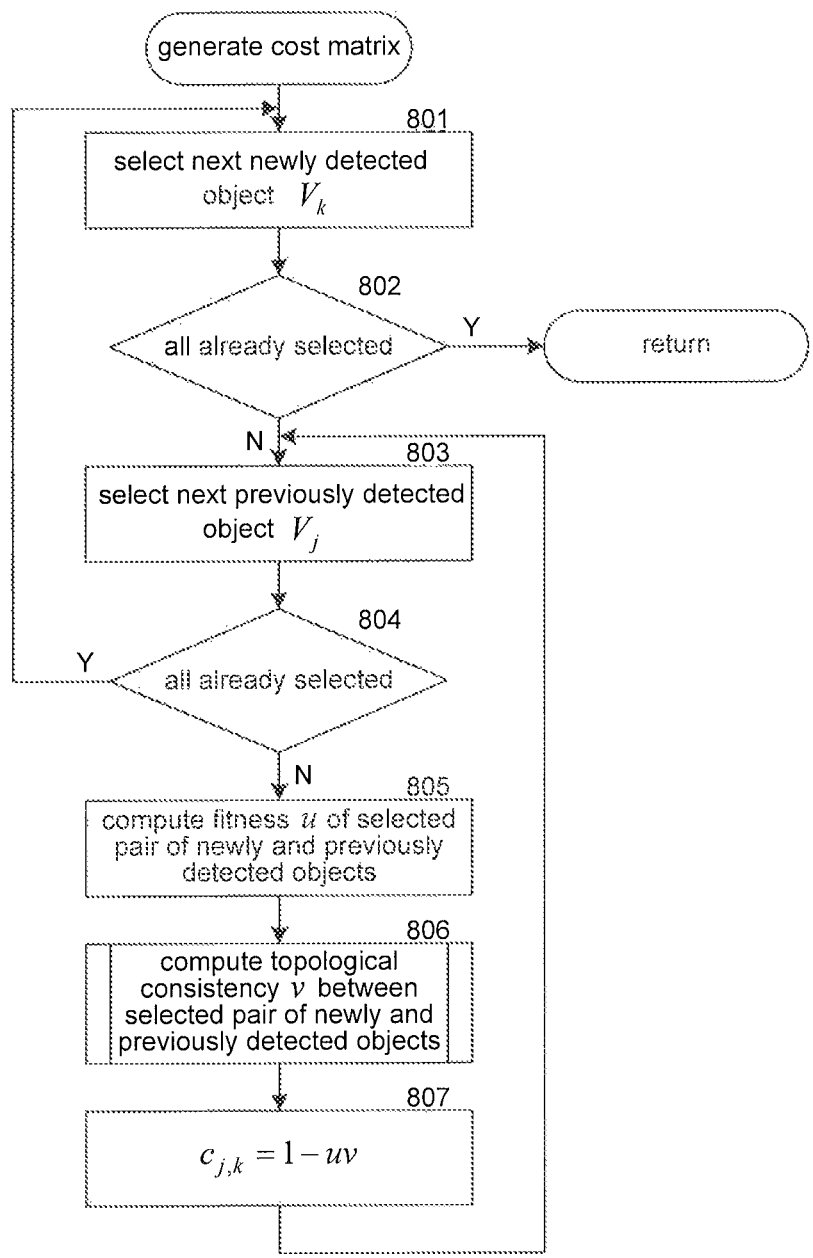
FIG. 8 is a flow diagram that illustrates the processing of the "generate cost matrix" component of the change detection system in some embodiments.

FIG. 8 is a flow diagram that illustrates the processing of the "generate cost matrix" component of the change detection system in some embodiments. The previously and newly detected objects in the root correspondence are supplied as input to this component. In block 801, the component selects the next newly detected object in the vicinity of the newly detected object of the root pair. In decision block 802, if all such objects have already been selected, then the component returns, else the component continues at block 803. In block 803, the component selects the next previously detected object in the vicinity of the previously detected object of the root pair. In decision block 804, if all such objects have already been selected, the component loops to block 801 to select the next newly detected object in the vicinity of the newly detected object of the root pair, else the component continues at block 805. In block 805, the component calculates the fitness u of the selected pair of previously and newly detected objects. In block 806, the component invokes the "compute topological consistency" component to calculate topological consistency v for the selected pair of previously and newly detected objects. In block 807, the component generates the cost of assigning the selected previously detected object to the selected newly detected object from the fitness u and the topological consistency v, and then loops to block 803 to select the next previously detected object in the vicinity of the previously detected object of the root pair.

Figure 9:
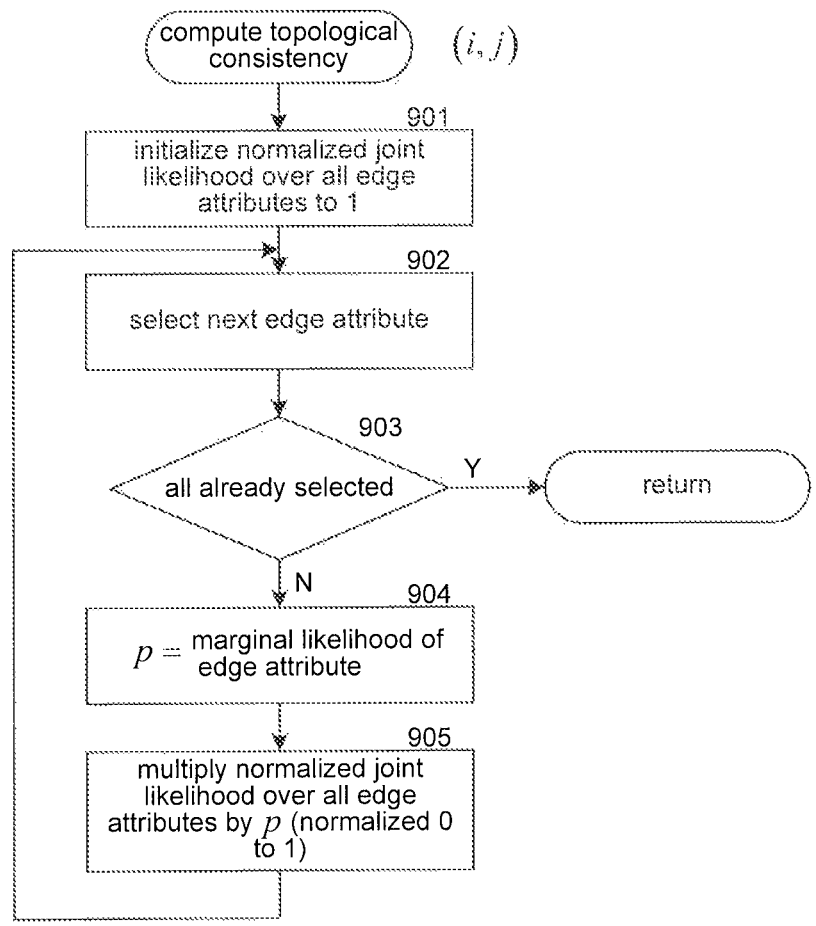
FIG. 9 is a flow diagram that illustrates the processing of the "compute topological consistency" component of the change detection system in some embodiments.

FIG. 9 is a flow diagram that illustrates the processing of the "compute topological consistency" component of the change detection system in some embodiments. For a pair of previously and newly detected objects, the inputs to this component are (i) the DART that contains the newly detected object, and (ii) the edge connecting the previously detected object to the previously detected object of the root pair. The output of this component is the degree of topological consistency (from 0 to 1) between (i) the edge connecting the newly detected object to the newly detected object of the root pair in the DART, and (ii) the edge connecting the previously detected object to the previously detected object of the root pair in the constellation database. In block 901, the component initializes the normalized joint likelihood over all edge attributed to 1. In block 902, the component selects the next edge attribute. In decision block 903, if all attributes associated with the edge connecting previously detected objects have already been selected, then the component returns the joint likelihood of attributes for the edge in (ii) above given the DART in (i) above normalized to a value from 0 to using Equation 1a, else the component continues to block 904. In block 904, the component computes the normalized marginal likelihood for the next selected attribute of the edge connecting previously detected objects using Equation 1b. In block 905, the component updates the product of normalized likelihoods over all edge attributes with the marginal likelihood from block 904, in accordance with Equation 1a, and then loops to block 902 to select the next edge attribute.

Figure 10:
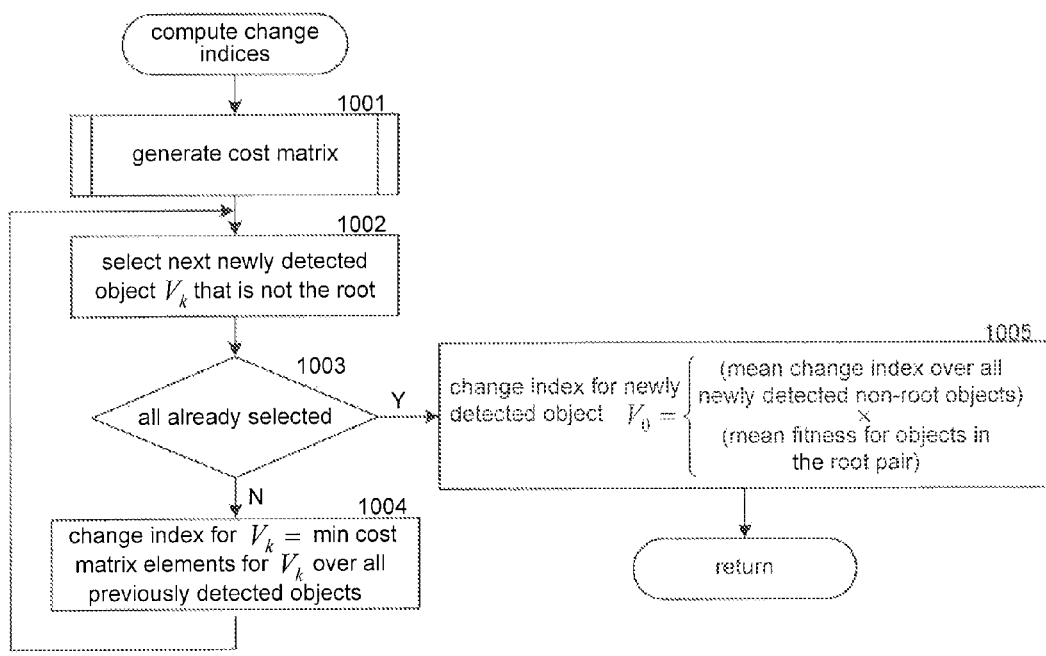
FIG. 10 is a flow diagram that illustrates the processing of the "compute change indices" component of the change detection system in some embodiments.

FIG. 10 is a flow diagram that illustrates the processing of the "compute change indices" component of the change detection system in some embodiments. The component generates the cost matrix and identifies the change index for each newly detected object. In block 1001, the component invokes the "generate cost matrix" component. In block 1002, the component selects the next newly detected object that is not the newly detected object of the root pair. In decision block 1003, if all such newly detected objects have already been selected, then the component continues at block 1005, else the component continues at block 1004. In block 1004, the component computes the change index for the selected newly detected object as the minimum of cost matrix elements for that newly detected object over all previously detected objects other than the previously detected object of the root pair, and then loops to block 1002 to select the next newly detected object. In block 1005, the component computes the change index for the newly detected object of the root pair as the product of the mean of change indices over all newly detected non-root objects and the mean of fitnesses for the objects in the root pair, and then returns.

Figure 11:
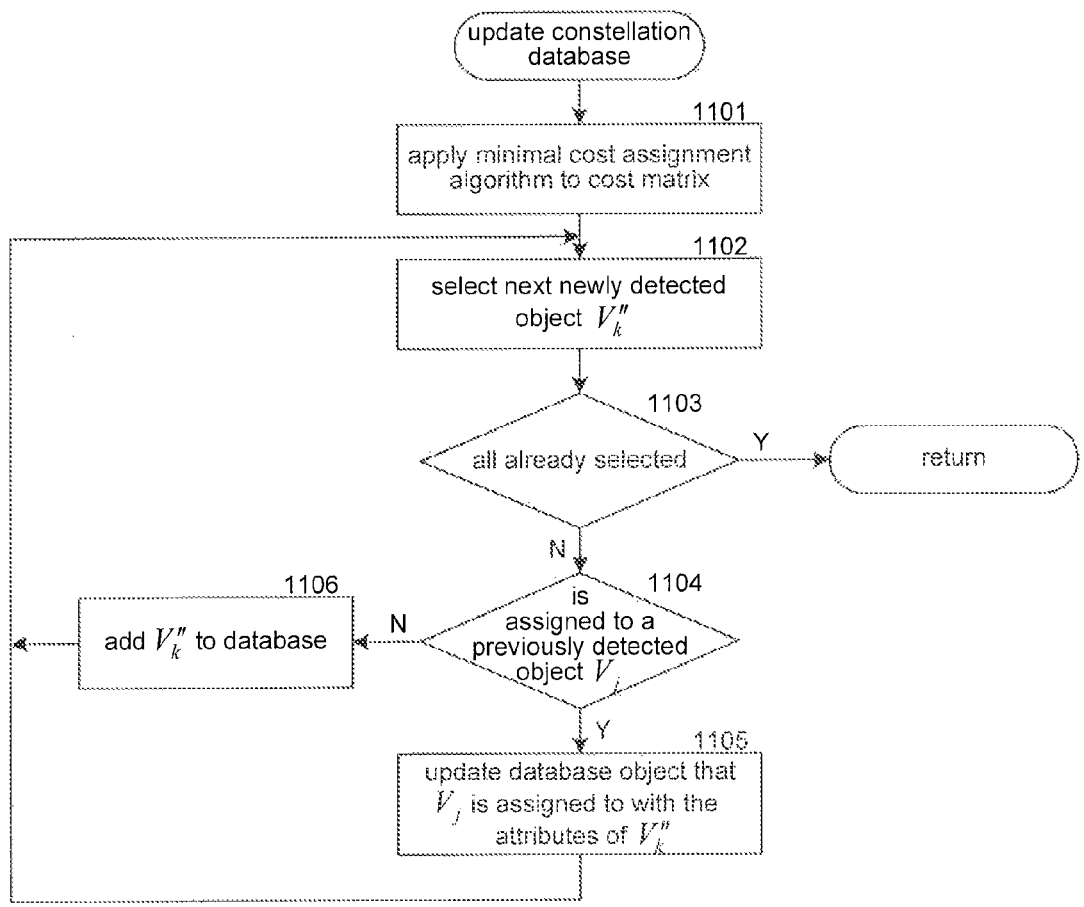
FIG. 11 is a flow diagram that illustrates the processing of the "update constellation database" component of the change detection system in some embodiments.

FIG. 11 is a flow diagram that illustrates the processing of the "update constellation database" component of the change detection system in some embodiments. The component updates the constellation database based on a minimal cost assignment of previously detected objects to newly detected objects. In block 1101, the component applies a minimum cost assignment algorithm to the cost matrix (i.e., it evaluates the cost matrix) to determine the most likely correspondences of previously detected objects to newly detected objects. In block 1102, the component selects the next newly detected object. In decision block 1103, if all the newly detected objects have already been selected, then the component returns, else the component continues at block 1104. In decision block 1104, if the selected newly detected object has been assigned to a previously detected object, then the component continues at block 1105, else the component continues at block 1106. In block 1105, the component updates the attributes of this previously detected object in the constellation database with attributes of the selected newly detected object, and then loops to block 1102 to select the next newly detected object. In block 1106, the component adds the selected newly detected object to the database as a new object and then loops to block 1102 to select the next newly detected object.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method in a computing device for determining whether a designated newly detected object represents an object that does not correspond to an object in a constellation of previously detected objects, the method comprising:
for each of a plurality of edge attributes, providing a likelihood function for generating a matching score indicating how well values for the edge attribute match;
selecting a root previously detected object and a root newly detected object as having a root correspondence;
calculating previous values for edge attributes for edges connecting the previously detected object to the root previously detected object from attributes of the previously detected objects;
calculating new values for edge attributes for edges connecting newly detected objects to the root newly detected object from attributes of the newly detected objects; and
indicating that the designated newly detected object is not a previously detected object based on
for each of a plurality of pairs of a previously detected object and a newly detected object,
for each edge attribute, generating a matching score using the provided likelihood function for the edge attribute to indicate how well the previous value of the edge attribute of the previously detected object of the pair and the new value of the edge attribute of the newly detected object of the pair match; and
combining the matching scores for the edge attributes into a combined matching score to indicate how well the previously detected object and the newly detected object of the pair match; and
applying a minimal cost assignment algorithm to costs derived from the combined matching scores to identify which newly detected objects correspond to which previously detected objects.

2. The method of claim 1 including generating a change index for the designated newly detected object indicating whether the designated newly detected object does not correspond to a previously detected object based on a minimum computed assignment costs to the previously detected objects.

3. The method of claim 2 wherein the change index is further based on fitness of detection of the object.

4. The method of claim 1 wherein the attributes of the objects are selected from a group consisting of location of the object, time the object was last detected, angle of long axis of the object, and length and width of the object.

5. The method of claim 1 wherein the edge attributes are selected from a group consisting of a pointing vector from a root detected object to a leaf detected object, difference in times of most recent detection of the root detected object and the leaf detected object, angle between long axis of the root or leaf detected object and vector from that root detected object to the leaf detected object, angle from a vector from the root detected object to a first leaf detected object to a vector from the root detected object to the leaf detected object, and angle between the long axis of the root detected object and the long axis of the leaf detected object.

6. A method in a computing device for determining whether a designated newly detected object represents an object that does not correspond to an object in a constellation of previously detected objects, the method comprising:
   for each of a plurality of edge attributes, providing a likelihood function for the edge attribute;
   selecting a root previously detected object and a root newly detected object as having a root correspondence;
   calculating previous values for edge attributes for edges connecting the previously detected object to the root previously detected object from attributes of the previously detected objects;
   calculating new values for edge attributes for edges connecting newly detected objects to the root newly detected object from attributes of the newly detected objects; and
   indicating that the designated newly detected object is not a previously detected object based on
      combining a likelihood for each edge attribute, the likelihood for an edge attribute generated by the likelihood function for that edge attribute applied to the previous value of that edge attribute given the new value of that edge attribute;
      assigning a cost to pairs of a newly detected object and a previously detected object, the cost being derived from the detection fitnesses and combined likelihoods of the edge attributes that define topological consistency; and
      applying a minimal cost assignment algorithm to the costs to identify possible correspondences between each newly detected object and a previously detected object.

7. The method of claim 6 including indicating a newly detected object corresponds to a previously detected object based on assignment of the minimal cost assignment algorithm.

8. A computer-readable medium that is not a transitory, propagating signal, the computer-readable medium storing computer-executable instructions for controlling a computing device to identify newly detected objects that correspond to previously detected objects, the computer-executable instructions implementing a method comprising:
   providing values for edge attributes for edges connecting the previously detected objects to a root previously detected object;
   providing values for edge attributes for edges connecting the newly detected objects to a root newly detected object;
   for each of a plurality pairs of a previously detected object and a newly detected object, generating a score based on a likelihood that the previously detected object corresponds to the newly detected object, by:
      for each edge attribute, generating a matching score using a likelihood function for the edge attribute to indicate how well the values of the edge attribute of the previously detected object and the newly detected object of the pair match; and
      combining the matching scores for the edge attributes into a combined matching score to indicate how well the previously detected object and the newly detected object of the pair match; and
   generating a mapping from newly detected objects to corresponding previously detected object based on the combined matching scores by applying a minimal cost assignment algorithm to costs represented by the combined matching scores
   wherein each newly detected object that is mapped to a previously detected object indicates that the newly detected object corresponds to that previously detected object.

9. The computer-readable medium of claim 8 wherein when no previously detected object maps to a newly detected object, indicating that the newly detected object is not a previously detected object.

10. The computer-readable medium of claim 8 wherein selecting a root previously detected object and a root newly detected object as having a root correspondence includes for pairs of a previously detected object and a newly detected object, evaluating the objects of the pair as having a root correspondence by calculating a mapping efficiency indicating how well the newly detected object corresponds to the previously detected object based on locations of the other newly detected objects in a vicinity of a root object relative to locations of other previously detected objects in the vicinity of a root object.

11. The computer-readable medium of claim 8 wherein the objects are detected based on return signals acquired by receivers from ground-penetrating radar signals emitted by transmitters.

12. The computer-readable medium of claim 8 including prior to generating the scores, identifying a root previously detected object and a root newly detected object as having a root correspondence and wherein the generating of a score for a previously detected object and a newly detected object factors in location of the previously detected object relative to the root previously detected object and location of the newly detected object relative to the root newly detected object.

13. The computer-readable medium of claim 8 including prior to generating the scores, identifying a root previously detected object and a root newly detected object as having a root correspondence and wherein a score is not generated for pairs that include either the root previously detected object or the root newly detected object.

14. A computing device for identifying newly detected objects that do not correspond to previously detected objects; comprising:
   a computer-readable storage medium storing values for edge attributes for edges connecting the previously detected objects to a root previously detected object and values for edge attributes for edges connecting the newly detected objects to a root newly detected object;

a component that, for each of a plurality of pairs of a previously detected object and a newly detected object, generates a score based on a likelihood that the previously detected object corresponds to the newly detected object, by:

for each edge attribute, generating a matching score using a likelihood function for the edge attribute to indicate how well the values of the edge attribute of the previously detected object and the newly detected object of the pair match; and combining the matching scores for the edge attributes into a combined matching score to indicate how well the previously detected object and the newly detected object of the pair match;

a component that applies a minimal cost assignment algorithm to costs represented by the combined matching scores to identify newly detected objects that correspond to previously detected objects; and a component that, for each newly detected object that does not correspond to a previously detected object, indicating that the newly detected object does not correspond to a previously detected object.

15. The computing device of claim 14 including a component that selects a root previously detected object and a root newly detected object as having a root correspondence;

calculates previous values for edge attributes for edges connecting the previously detected object to the root previously detected object from attributes of the previously detected objects;

calculates new values for edge attributes for edges connecting newly detected objects to the root newly detected object from attributes of the newly detected objects; and generates the likelihood by combining a likelihood for each edge attribute, the likelihood for an edge attribute generated by the likelihood function for that edge attribute applied to the previous value of that edge attribute given the new value of that edge attribute.

16. The computing device of claim 15 wherein the component that selects a root previously detected object and a root newly detected object as having a root correspondence, for pairs of a previously detected object and a newly detected object, calculates a mapping efficiency indicating how well the newly detected object corresponds to the previously detected object based on locations of the other newly detected objects relative to locations of other previously detected objects.

17. The computing device of claim 16 wherein the objects are detected based on return signals acquired by receivers from ground-penetrating radar signals emitted by transmitters.

18. A method performed by a computing device for determining which objects in a first set of objects are the same objects in a second set of objects, comprising:

providing values for edge attributes for edges connecting the objects in the first set to a first root object of the first set;

providing values for edge attributes for edges connecting the objects in the second set to a second root object in the second set;

for pairs of objects that include an object in the first set and an object in the second set, generating a score indicating how well the objects of the pair match based on comparison of the values of the edge attributes of the objects, the score being generated by combining a likelihood score for each edge attribute, each likelihood score for an edge attribute generated by a likelihood function indicating a likelihood that the objects of the pair match based on the values for the edge attributes for the objects of the pair; and applying a minimal cost assignment algorithm to costs derived from the scores to identify an assignment of objects in the first set to objects in the second set wherein an object in the first set corresponds to an object in the second set when the minimal cost assignment algorithm assigns that object of the first set to that object of the second set, and wherein the first set represents newly detected objects and the second set represents previously detected objects, and the first root object and the second root object are identified initially as best matching objects.

19. The method of claim 18 including prior to generating the scores, identifying a root object from the first set and a root object of the second set that are considered to be the same object, wherein the objects have locations and wherein attribute values for an object in the first set is based at least in part on location of the object relative to the root object of the first set and attribute values for an object in the second set is based at least in part on location of the object relative to the root object of the second set.

* * * * *